(12) United States Patent
Kang et al.

(10) Patent No.: US 12,528,890 B2
(45) Date of Patent: Jan. 20, 2026

(54) SPHERE-LIKE SUPER-MACROPOROUS MESOPOROUS MATERIAL AND POLYOLEFIN CATALYST CONTAINING SAME

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yu Kang, Beijing (CN); Xinping Lyu, Beijing (CN); Dongbing Liu, Beijing (CN); Zifang Guo, Beijing (CN); Hongmei Liu, Beijing (CN); Bingyi Li, Beijing (CN); Ruen Wang, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 481 days.

(21) Appl. No.: 18/000,716

(22) PCT Filed: Oct. 30, 2020

(86) PCT No.: PCT/CN2020/125296
§ 371 (c)(1),
(2) Date: Dec. 5, 2022

(87) PCT Pub. No.: WO2021/243936
PCT Pub. Date: Dec. 9, 2021

(65) Prior Publication Data
US 2023/0235098 A1   Jul. 27, 2023

(30) Foreign Application Priority Data
Jun. 5, 2020   (CN) .......................... 202010507083.9

(51) Int. Cl.
*B01J 21/10* (2006.01)
*B01J 23/02* (2006.01)
(Continued)

(52) U.S. Cl.
CPC ................. *C08F 4/02* (2013.01); *B01J 35/40* (2024.01); *B01J 35/51* (2024.01); *C08F 4/605* (2013.01);
(Continued)

(58) Field of Classification Search
CPC .......... B01J 21/063; B01J 21/10; B01J 23/02; C08F 4/02; C08F 4/10; C08F 4/16;
(Continued)

(56) References Cited

U.S. PATENT DOCUMENTS 6,423,770 B1 * 7/2002 Katz ....................... C01B 37/00
524/492
6,544,923 B1 * 4/2003 Ying .................... B01J 31/2286
502/159

(Continued)

FOREIGN PATENT DOCUMENTS

| CN | 1579935 A | 2/2005 |
|---|---|---|
| CN | 1657571 A | 8/2005 |

(Continued)

OTHER PUBLICATIONS

Xu, Lixin et al.; "Surface-initiated catalytic ethylene polymerization within nano-channels of ordered mesoporous silicas for synthesis of hybrid silica composites containing covalently tethered polyethylene"; Polymer; vol. 52, No. 26; Nov. 5, 2011; ISSN: 0032-3861; pp. 5961-5974.

*Primary Examiner* — Cam N. Nguyen
(74) *Attorney, Agent, or Firm* — NKL Law; Allen Xue

(57) ABSTRACT

Disclosed are a sphere-like super-macroporous mesoporous material, a polyolefin catalyst, and a preparation method therefor and an olefin polymerization process. The sphere-like super-macroporous mesoporous material has a two-dimensional hexagonal ordered pore channel structure. The mesoporous material has an average pore size of 10 nm to 15 nm, a specific surface area of 300 m²/g to 400 m²/g, and (Continued)

an average particle size of 1 μm to 3 μm, based on the total mass of the mesoporous material. The mass content of water in the mesoporous material is <1 ppm. The mass content of oxygen in the mesoporous material is <1 ppm. When a polyolefin catalyst prepared with the mesoporous material as a carrier is used for an olefin polymerization reaction, a polyolefin product with a narrow molecular weight distribution and a good melt index can be obtained.

18 Claims, 5 Drawing Sheets

(51) Int. Cl.
| | |
|---|---|
| *B01J 35/40* | (2024.01) |
| *B01J 35/51* | (2024.01) |
| *C08F 4/02* | (2006.01) |
| *C08F 4/10* | (2006.01) |
| *C08F 4/16* | (2006.01) |
| *C08F 4/18* | (2006.01) |
| *C08F 4/605* | (2006.01) |

(52) U.S. Cl.
CPC ...... *C08F 2410/04* (2013.01); *C08F 2410/06* (2021.01)

(58) Field of Classification Search
CPC .......... C08F 4/18; C08F 4/605; C08F 4/6055; C08F 2410/04; C08F 2410/06
See application file for complete search history.

(56) References Cited

U.S. PATENT DOCUMENTS

| | | | | |
|---|---|---|---|---|
| 7,153,804 B2* | 12/2006 | Chen | ...................... | C08F 10/00 502/118 |
| 7,172,988 B2* | 2/2007 | Gao | ...................... | C08F 10/00 526/143 |
| 7,332,455 B2* | 2/2008 | Wei | ...................... | C08F 10/00 502/115 |
| 8,268,945 B2* | 9/2012 | Zhang | ...................... | C08F 10/02 502/118 |
| 8,541,333 B2* | 9/2013 | Xie | ...................... | C08F 10/06 526/236 |
| 9,150,422 B2* | 10/2015 | Nakayama | ...................... | H01M 4/48 |
| 9,518,238 B2* | 12/2016 | Chen | ...................... | C01B 37/005 |
| 10,010,864 B2* | 7/2018 | Flores Sanchez | ...... | C10G 25/003 |
| 10,022,332 B2* | 7/2018 | Liu | ...................... | B01J 13/22 |
| 10,155,826 B2* | 12/2018 | Holtcamp | .......... | B01J 20/28061 |
| 10,174,141 B2* | 1/2019 | Wang | ...................... | C08F 110/02 |
| 10,239,967 B2* | 3/2019 | Holtcamp | .............. | B01D 53/02 |
| 10,294,312 B2* | 5/2019 | Holtcamp | .............. | C10G 45/60 |
| 10,350,172 B2* | 7/2019 | Liu | ...................... | A61K 9/5031 |
| 10,478,801 B2* | 11/2019 | Flores Sanchez | ... | C10G 25/003 |
| 10,577,435 B2* | 3/2020 | Hamed | ................... | B01J 35/617 |
| 11,033,507 B2* | 6/2021 | Yu | ...................... | A61K 39/39 |
| 11,186,656 B2* | 11/2021 | McDaniel | .............. | C01B 33/18 |
| 11,384,175 B2* | 7/2022 | McDaniel | .............. | C01B 33/18 |
| 11,548,958 B2* | 1/2023 | McDaniel | .............. | C08F 110/02 |
| 2008/0227936 A1 | 9/2008 | Dai et al. | | |
| 2009/0318643 A1* | 12/2009 | Chen | ...................... | B01J 31/128 502/158 |
| 2011/0257006 A1* | 10/2011 | Thieuleux | .............. | B82Y 30/00 502/262 |
| 2012/0283337 A1* | 11/2012 | Brick | ................... | C01G 23/053 502/355 |
| 2013/0150540 A1* | 6/2013 | Wang | ...................... | C08F 4/6494 502/115 |
| 2014/0106269 A1 | 4/2014 | Tanaka et al. | | |
| 2015/0239998 A1* | 8/2015 | Chen | ...................... | B01J 31/128 502/171 |

FOREIGN PATENT DOCUMENTS

| | | |
|---|---|---|
| CN | 101412763 A | 4/2009 |
| CN | 102952217 A | 3/2013 |
| CN | 103586065 A | 2/2014 |
| CN | 103586078 A | 2/2014 |
| CN | 103920496 A | 7/2014 |
| CN | 110614097 A | 12/2019 |
| CN | 111100223 A | 5/2020 |
| EP | 0906349 B1 | 11/2002 |
| JP | H07172814 A | 7/1995 |
| JP | 2008524344 A | 7/2008 |
| JP | 2014095888 A | 5/2014 |
| JP | 2015124285 A | 7/2015 |
| RU | 2411998 C2 | 2/2011 |
| WO | 2005075068 A1 | 8/2005 |
| WO | 2020083386 A1 | 4/2020 |

* cited by examiner

SPHERE-LIKE SUPER-MACROPOROUS MESOPOROUS MATERIAL AND POLYOLEFIN CATALYST CONTAINING SAME

TECHNICAL FIELD

The present disclosure relates to the technical field of heterogeneously catalyzed olefin polymerization reactions, and specifically to a sphere-like super-macroporous mesoporous material and a preparation method thereof, a polyolefin catalyst comprising the aforementioned sphere-like super-macroporous mesoporous material and a preparation method thereof, and a method for olefin polymerization using the above polyolefin catalyst.

BACKGROUND ART

The preparation technology of the carrier is one of the core technologies in the production of polyolefin catalysts. Looking at the preparation technologies of catalysts for the current various polyethylene production processes, the carrier used is mainly silica gel. Ordinary silica gel cannot be used as a carrier for polyolefin catalysts. There are high technical requirements on a carrier silica gel for polyolefin catalysts, such as a certain bulk density, specific surface area, pore structure (pore volume, pore size, pore distribution), abrasion strength, etc., so that the development of such a carrier silica gel is difficult.

WO2020083386A1 discloses a mesoporous material-containing polyolefin catalyst component and its preparation method and use. The mesoporous material is one that has been subjected to a thermal activation treatment, and the mesoporous material is selected from the group consisting of: a) a mesoporous material with a two-dimensional hexagonal channel structure; b) an eggshell-like mesoporous material with a two-dimensional hexagonal channel structure; c) a spherical mesoporous silica with a body-centered cubic structure; and d) a hexagonal mesoporous material with a cubic cage-like channel structure. It discloses that when the above mesoporous material is used in a polyolefin catalyst and the polyolefin catalyst is used in an olefin polymerization reaction, it has a higher catalytic efficiency and can afford a polyolefin product with a narrower molecular weight distribution and a better melt index. However, the catalytic efficiency of the polyolefin catalyst still needs to be further improved.

SUMMARY OF THE INVENTION

The inventors have found through diligent research that a new sphere-like super-macroporous mesoporous material is particularly suitable for use as a carrier for polyolefin catalysts, and the sphere-like super-macroporous mesoporous material can be easily prepared. Polyolefin catalysts prepared by using this sphere-like super-macroporous mesoporous material as a carrier have significantly higher catalytic efficiency.

Therefore, an object of the present disclosure is to provide a mesoporous material, which has a two-dimensional hexagonal ordered channel structure, and which has an average pore diameter of from 10 nm to 15 nm, a specific surface area of from 300 $m^2/g$ to 400 $m^2/g$, and an average particle size of from 1 μm to 3 μm;

based on the total mass of the mesoporous material, the mass content of water in the mesoporous material is less than 1 ppm, preferably less than 0.5 ppm, and more preferably less than 0.1 ppm, and the mass content of oxygen in the mesoporous material is less than 1 ppm, preferably less than 0.5 ppm, and more preferably less than 0.1 ppm.

Another object of the present disclosure is to provide a method for preparing the mesoporous material, comprising:
(1) mixing and contacting a silicon source, an acid agent, ammonium fluoride and heptane in the presence of a template agent and water, and subjecting the mixture resulting from the mixing and contacting in sequence to crystallization, filtering and drying, to afford a raw powder of the mesoporous material;
(2) subjecting the raw powder of the mesoporous material in sequence to a template agent-removing treatment, a primary thermal activation treatment and a secondary thermal activation treatment, to afford the mesoporous material.

Another object of the present disclosure is to provide a polyolefin catalyst comprising a carrier and, supported on the carrier, a magnesium component, a titanium component and an optional electron donor component, wherein the carrier is the above-described mesoporous material.

Still another object of the present disclosure is to provide a method for preparing the above-described polyolefin catalyst, comprising:
(i) under an inert atmosphere, (ia) conducting impregnation treatment of the above-described mesoporous material with a solution containing a magnesium component and then with a solution containing a titanium component, (ib) conducting impregnation treatment of the above-described mesoporous material with a solution containing a titanium component and then with a solution containing a magnesium component, or (ic) conducting co-impregnation treatment of the above-described mesoporous material with a solution containing both a titanium component and a magnesium component, to obtain a slurry; and
(ii) spray drying the slurry from step (i), to obtain the polyolefin catalyst.

Still another object of the present disclosure is to provide a method for olefin polymerization, comprising a) polymerizing olefin monomer(s) in the presence of the above-described polyolefin catalyst and a cocatalyst under polymerization reaction conditions to provide a polyolefin; and b) recovering the polyolefin.

The mesoporous material of the present disclosure has a two-dimensional hexagonal ordered channel structure and a sphere-like morphology. Because of its super large and ordered channel structure, it has significate advantages in reducing powder agglomeration and improving flowability. Using this sphere-like mesoporous material as a carrier of polyolefin catalysts can combine the advantages of microspheres and mesoporous materials, that is, not only the characteristics of high specific surface area, large pore volume, large pore size and narrow pore size distribution of the mesoporous materials can be retained, but also the agglomeration of the mesoporous materials can be reduced, thereby increasing their flowability. The obtained polyolefin catalyst particles have stable structure and high strength, are not easily broken, have small particle sizes, uniform particle size distribution and narrow particle size distribution curves, are capable of effectively controlling the moisture content of the particles, preventing the carrier particles from deliquescing and bonding, avoiding the agglomeration of the catalyst during use, and improving their flowability. These advantages bring convenience to the storage, transportation, postprocessing and application of the obtained polyolefin catalysts.

Moreover, the large average pore diameter of the mesoporous material can allow the active components of the polyolefin catalyst to enter its abundant internal pores, rather than just being supported on the outer surfaces of the mesoporous material. In particular, the hexagonal direct-connection channels and the sphere-like structure possessed by the mesoporous material are also more favorable to the entry of the active components of the catalyst, and the resulting catalyst has excellent catalytic efficiency.

Further, by using the method of the present disclosure to prepare the sphere-like mesoporous materials, it is possible to obtain sphere-like mesoporous materials with small particle size, narrow particle size distribution, moderate specific surface area, large pore volume, large pore size and narrow pore size distribution without grinding. In addition, the mesoporous materials have good flowability. Thus, not only the grinding process is omitted, but also the catalytic efficiency of the catalyst prepared from the mesoporous materials can be improved.

In addition, when using the method of the present disclosure to prepare polyolefin catalysts, spray drying technology can be used to directly obtain sphere-like polyolefin catalysts. The operation is simple, the resulting slurry can be made more delicate, and the loading of active components can be effectively increased. The obtained polyolefin catalyst particles have stable structure and high strength, are not easily broken, and have small particle size, uniform particle size distribution and narrow particle size distribution curve, and excellent catalytic activity. When the polyolefin catalyst is used in olefin polymerization, a significantly improved conversion rate of raw materials can be obtained.

In addition, when the polyolefin catalyst According to the present disclosure is used in olefin polymerization, the molecular weight distribution and melt index of the resulting polyolefin product can be improved, and the resulting polyolefin product has a sphere-like shape and a uniform particle size.

Other features and advantages of the present disclosure will be described in detail below.

BRIEF DESCRIPTION OF THE DRAWINGS

The accompanying drawings are used to provide a further understanding of the present disclosure and constitute a part of the specification. Together with the following specific embodiments, they are used to explain the present disclosure, but do not constitute a limitation to the present disclosure. In the drawings.

DESCRIPTION OF PREFERRED EMBODIMENTS

Figure 1:
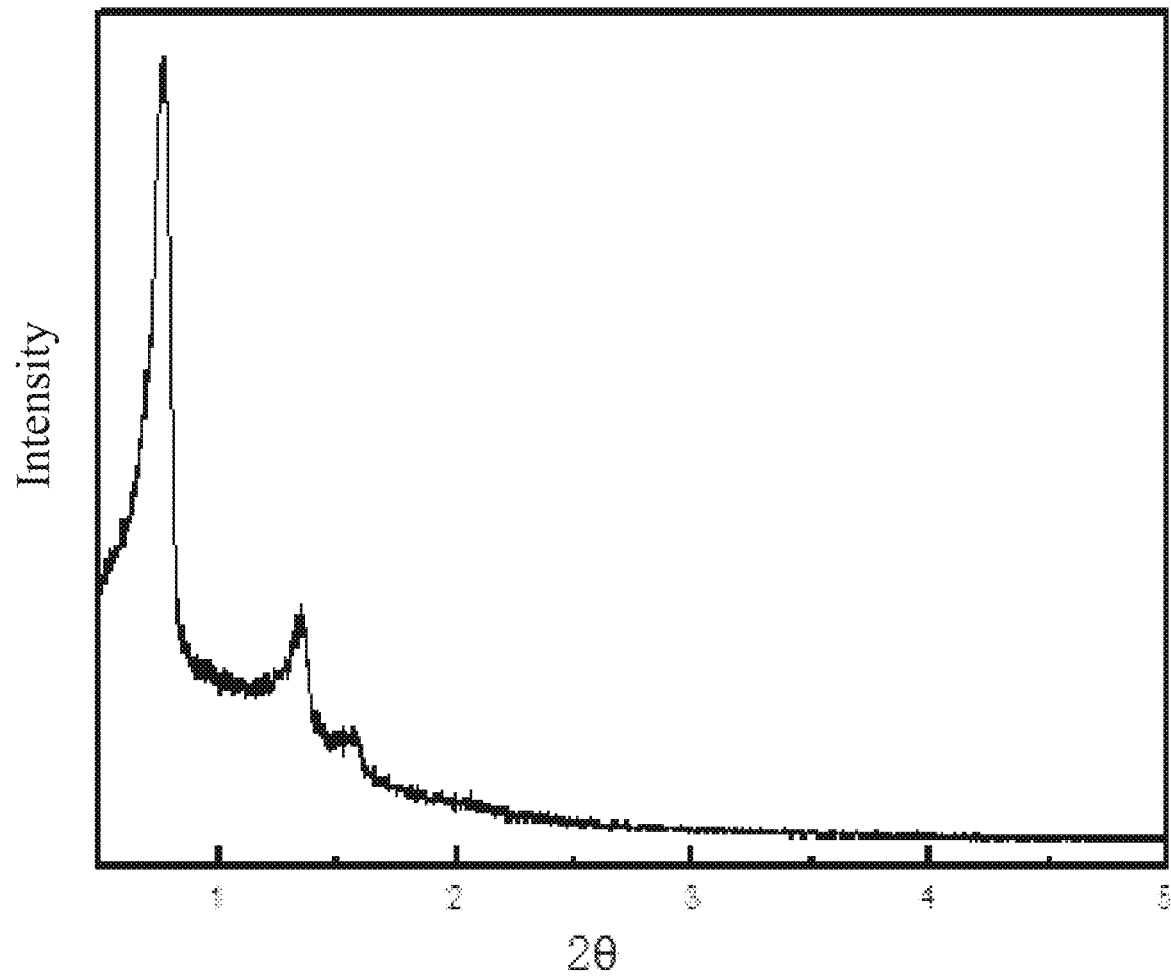
FIG. 1 is an XRD pattern of the sphere-like super-macroporous mesoporous material provided by Example 1.

The endpoints of and any values within the ranges disclosed herein are not limited to the precise ranges or values, and these ranges or values should be understood as including values close to these ranges or values. For numerical ranges, the end values of individual ranges, the end values of individual ranges and the individual point values therebetween, and the individual point values can be combined with each other to obtain one or more new numerical ranges, which should be considered as being specifically disclosed herein.

According to the regulations of the International Union of Pure and Applied Chemistry (IUPAC), mesoporous materials refer to a class of porous materials with a pore diameter between 2 nm and 50 nm. The term "mesoporous material" as used herein has the same meanings as the above.

As used herein, the term "catalyst" refers to a main catalyst component or procatalyst, which, together with a conventional cocatalyst such as an alkyl aluminum and an optional external electron donor, constitutes a catalyst system for olefin polymerization.

As used herein, the term "halogen" refers to fluorine, chlorine, bromine and iodine.

In the context, unless otherwise specified, the average particle size and the SPAN value of the particle size distribution of a material are measured by using a laser particle size distribution analyzer, and the specific surface area, pore volume, and average pore size are measured through nitrogen adsorption method. In the context, unless otherwise specified, the particle size refers to the particle size of a particulate material, wherein the particle size is expressed by the diameter of a sphere when the particulate material is in a sphere form, by the side length of a cube when the particulate material is in a cube or approximate cube form, or by the mesh size of the sieve that is just able to screen out the particulate material when the particulate material is of an irregular shape.

In the present disclosure, room temperature refers to 23° C.±2° C.

In a first aspect, the present disclosure provides a mesoporous material, which has a two-dimensional hexagonal ordered channel structure, and which has an average pore diameter of from 10 nm to 15 nm, a specific surface area of from 300 $m^2/g$ to 400 $m^2/g$, and an average particle size of from 1 μm to 3 μm; the mass content of water in the mesoporous material is less than 1 ppm, preferably less than 0.5 ppm, and more preferably less than 0.1 ppm, and the mass content of oxygen in the mesoporous material is less than 1 ppm, preferably less than 0.5 ppm, and more preferably less than 0.1 ppm, based on the total mass of the mesoporous material.

In the present disclosure, the mesoporous material is a mesoporous silica particulate material.

The "two-dimensional hexagonal ordered channel structure" is a term with precise meaning in the field of catalysts and catalyst supports. In the present disclosure, the term "two-dimensional hexagonal ordered channel structure" has a meaning similar to the usual meaning known in the prior art, meaning that the channels are distributed neatly and orderly, and the channels are of hexagonal channel shape.

The mesoporous material According to the present disclosure has a morphology of sphere-like (also referred to as subsphaeroidal) particle. "Sphere-like mesoporous material" means that the particle shape of the mesoporous material is merely close to sphere, that is, the mesoporous material does not have a perfect appearance like a sphere (for example, the requirements on sphere shape are not met at one or more local positions), but has generally a sphere-like appearance.

The mesoporous material According to the present disclosure is a sphere-like super-macroporous mesoporous material. The term "super-macroporous mesoporous material" as used herein refers to a mesoporous material, which has an average pore diameter of no less than 10 nm, and in which the number of pores with a pore diameter of no less than 10 nm accounts for more than 50% of the total number of pores.

In the present disclosure, the content of water in the mesoporous material is measured by a Karl Fischer moisture analyzer, and the content of oxygen in the mesoporous material is measured by an oxygen and nitrogen analyzer. In the present disclosure, the water content and the oxygen content of the mesoporous material include the water content and oxygen content, respectively, both in the inner pores of the mesoporous material and on the outer surface of the mesoporous material. In the present disclosure, ppm refers to the ratio of the mass of oxygen gas or water to the total mass of the mesoporous material.

The sphere-like super-macroporous mesoporous material according to the present disclosure has a specific two-dimensional hexagonal ordered channel structure. The mesoporous channel structure of the mesoporous material is evenly distributed and has a suitable pore size, and the mesoporous material has a small particle size, low moisture and oxygen contents, a good mechanical strength, and a good structural stability, and is particularly conducive to the good dispersion of magnesium- and titanium-based active components on the surface of the carrier, so that the prepared polyolefin catalyst not only has the advantages of supported catalysts such as good dispersion of metal active components, high loading, few side reactions, simple post-treatment, etc., but also has a higher catalytic activity so as to ensure that, when used in the polymerization of olefin monomers, the supported catalyst made by using the sphere-like super-macroporous mesoporous material as a carrier has better catalytic activity and significantly improved conversion of the raw materials.

Preferably, the mesoporous material according to the present disclosure has an average pore diameter of from 10 nm to 15 nm, a specific surface area of from 300 m$^2$/g to 400 m$^2$/g, and an average particle size of from 1 μm to 3 μm. When the sphere-like super-macroporous mesoporous material carrier has a specific surface area less than 300 m$^2$/g, a particle size less than 1 μm, and/or an average pore diameter less than 10 nm, the supported catalyst made by using it as a carrier will have a significantly reduced catalytic activity; when the sphere-like super-macroporous mesoporous material carrier has a specific surface area more than 400 m$^2$/g, a particle size more than 3 μm, and/or an average pore diameter more than 15 nm, the supported catalyst made by using it as a carrier will be prone to agglomeration during the olefin polymerization, thereby affecting the conversion of olefin monomers in the olefin polymerization.

Further, when the structure parameters of the sphere-like super-macroporous mesoporous material with a two-dimensional hexagonal channel structure are controlled within the following ranges: 11 nm to 13 nm for the average pore diameter, 310 m$^2$/g to 380 m$^2$/g for the specific surface area, and 1.1 μm to 2.9 μm for the average particle size, the supported catalyst made by using it as a carrier can further increase the conversion of the reaction raw materials during the olefin polymerization.

According to the present disclosure, the content of water in the mesoporous material is controlled to be less than 0.1 ppm, and the content of oxygen gas in the mesoporous material is controlled to be less than 0.1 ppm. In this way, the catalyst made by using it as a carrier is not prone to agglomeration during the olefin polymerization and has an excellent catalytic activity.

In some embodiments, the mesoporous material has a contact angle of from 101° to 130°, preferably from 115° to 125°, and more preferably from 118° to 124°. It has been found that when the mesoporous material has a contact angle of from 101° to 130°, it is particularly conducive to the good dispersion of the magnesium- and titanium-based active components on the surface of the carrier when it is used as a carrier to prepare a supported catalyst, so that the prepared polyolefin catalyst not only has the advantages of supported catalysts such as good dispersion of metal active components, high loading, few side reactions, simple post-treatment, etc., but also has a higher catalytic activity so as to ensure that, when used in the polymerization of olefin monomers, the supported catalyst made by using the sphere-like super-macroporous mesoporous material as a carrier has better catalytic activity. The mesoporous materials known in the prior art have generally a contact angle much less than 100°. For example, a commercially available mesoporous material product, SBA-15, has a contact angle of 20°.

Furthermore, when the contact angle of the mesoporous material is from 115° to 125°, preferably from 118° to 124°, the catalyst prepared therefrom has more excellent technical effects.

In the present disclosure, the contact angle of the mesoporous material is measured by RDAX.

According to the present disclosure, the mesoporous material is obtained by treating a thermally activated mesoporous material with a chlorine-containing silane. Preferably, the chlorine-containing silane is at least one selected from dichlorodimethoxysilane, monochlorotrimethoxysilane, dichlorodiethoxysilane and monochlorotriethoxysilane.

In the present disclosure, the chlorine-containing silane treatment may be accomplished by stirring the thermally-activated mesoporous material together with the chlorine-containing silane in the presence or absence of other media such as an inert solvent, and the treatment temperature may be in a range of from 20 to 150° C., preferably from 30 to 120° C., and more preferably from 40 to 100° C.

The amount of the chlorine-containing silane used may be 0.2 to 1.5 g per gram of the thermally-activated mesoporous material.

The thermal activation treatment will be described below.

In a preferred embodiment of the present disclosure, the mesoporous material has a pore volume of from 1 mL/g to 2 mL/g, and preferably from 1.5 mL/g to 1.9 mL/g. When the pore volume falls within the above ranges, the prepared supported catalyst is not prone to agglomeration during the olefin polymerization and has more excellent catalytic activity.

In some embodiments, the mesoporous material According to the present disclosure has a crushing strength, measured according to the GB3635-1983 standard method, of from 0.001 N/cm to 0.6 N/cm, preferably from 0.01 N/cm to 0.55 N/cm, and more preferably from 0.1 N/cm to 0.45 N/cm. When the mesoporous material has a crushing strength falling within the above ranges, the particles of the catalyst prepared therefrom has a stable structure and a high strength and are not easily crushed.

In some embodiments, the mesoporous material according to the present disclosure has a particle size distribution of from 0.01 to 3, and preferably from 0.1 to 2.8. When the mesoporous material has a particle size distribution of from 0.01 to 3, the supported catalyst prepared by using it as a carrier is not prone to agglomeration during the olefin polymerization and has a higher catalytic activity.

In a second aspect, the present disclosure provides a method for preparing the sphere-like mesoporous material, comprising:

(1) mixing and contacting a silicon source, an acid agent, ammonium fluoride and heptane in the presence of a template agent and water, and subjecting the mixture resulting from the mixing and contacting in sequence to crystallization, filtering and drying, to afford a raw powder of the sphere-like mesoporous material;

(2) subjecting the raw powder of the sphere-like mesoporous material in sequence to a template agent-removing treatment, a primary thermal activation treatment and a secondary thermal activation treatment, to afford the mesoporous material.

In some embodiments, in step (1), the operation of the mixing and contacting includes mixing at a temperature of 25° C. to 60° C. for at least 4 minutes and then standing for at least 1 hour. In order to facilitate the uniform mixing of the substances, the mixing and contacting are carried out under stirring conditions in a preferred embodiment of the present disclosure. Preferably, the operation of the mixing and contacting includes stirring at a temperature of 25° C. to 60° C. for 10 min to 240 min and then standing for 4 hours to 24 hours.

In some embodiments, a molar ratio of the template agent to the silicon source to the acid agent to the ammonium fluoride to the heptane is 1:2 to 500:100 to 2000:0.7 to 200:20 to 1650. Preferably, the molar ratio of the template agent to the silicon source to the acid agent to the ammonium fluoride to the heptane is 1:10 to 250:200 to 500:1 to 180:50 to 1450.

In the present disclosure, the addition of ammonium fluoride, the use of heptane, and the application of the secondary thermal activation treatment together are key factors for obtaining the sphere-like super-macroporous mesoporous material of the present disclosure.

Preferably, the template agent is a triblock copolymer of polyoxyethylene-polyoxypropylene-polyoxyethylene ($EO_{20}PO_{70}EO_{20}$). This template agent is available commercially (for example, it can be purchased from Aldrich Company under the trade name of P123, and the molecular formula is $EO_{20}PO_{70}EO_{20}$), or can be prepared by various existing methods. The number of moles of the template agent is calculated based on the average molecular weight of the polyoxyethylene-polyoxypropylene-polyoxyethylene.

In the present disclosure, examples of the silicon source include, but are not limited to, ethyl orthosilicate, methyl orthosilicate, propyl orthosilicate, sodium orthosilicate and silica sol, and more preferably ethyl orthosilicate. The acid agent may be a conventional substance known in the art that can provide acidic conditions, such as hydrochloric acid, sulfuric acid, etc., preferably hydrochloric acid. In the present disclosure, the heptane refers to a straight or branched chain alkane having 7 carbon atoms, preferably n-heptane.

According to the present disclosure, the crystallization conditions include: a crystallization temperature of 90° C. to 180° C., and a crystallization time of 10 h to 40 h. Preferably, the crystallization temperature is 95° C. to 105° C., and the crystallization time is 20 h to 36 h.

In the present disclosure, the template agent-removing treatment includes calcining the raw powder of the sphere-like mesoporous material at 300° C. to 600° C. for 8 h to 20 h.

Through the primary thermal activation treatment, the mass content of water in the mesoporous material is controlled to no more than 100 ppm, and the mass content of oxygen in the mesoporous material is controlled to no more than 100 ppm.

In the present disclosure, the thermal activation treatments are performed under an inert atmosphere, and after the primary thermal activation treatment, the temperature is lowered to the ambient temperature (such as room temperature) and then increased again to perform the secondary thermal activation treatment.

In the present disclosure, through the secondary thermal activation treatment, the content of water in the mesoporous material can be controlled to 1 ppm or less, preferably 0.5 ppm or less, and more preferably 0.1 ppm or less, and the content of oxygen in the mesoporous material can be controlled to 1 ppm or less, preferably 0.5 ppm or less, and more preferably 0.1 ppm or less. The catalyst made by using such a mesoporous material as a carrier is not prone to agglomeration during handling and olefin polymerization, and the obtained catalyst has an excellent catalytic activity.

According to the present disclosure, the conditions for the primary thermal activation treatment include: in an inert atmosphere, a treatment temperature of from 250° C. to 900° C., preferably 250° C. to 700° C., and more preferably 250° C. to 650° C., and a treatment time of from 1 to 48 hours, preferably 4 to 48 hours, and more preferably 6 to 24 hours. In the present disclosure, unless otherwise specified, the treatment time refers to the period of time, for which the treated material is within the above-mentioned treatment temperature ranges.

Preferably, the manner for the primary thermal activation treatment includes: in an inert atmosphere, increasing the temperature from the ambient temperature at a rate of from 0.5 to 10° C. per minute, and preferably from 0.5 to 1.5° C. per minute, to 200 to 300° C., maintaining for 1 to 10 hours, further increasing the temperature at a rate of from 0.5 to 10° C. per minute, and preferably from 0.5 to 1.5° C. per minute, to 400 to 900° C., preferably 500 to 700° C., and more preferably 550 to 650° C., and maintaining for 2 to 10 hours.

According to the present disclosure, the conditions for the secondary thermal activation treatment include: in an inert atmosphere, a treatment temperature of 250 to 900° C., preferably 250 to 700° C., and more preferably 250 to 650° C., and a treatment time of 1 to 48 hours, preferably 4 to 48 hours, and more preferably 6 to 24 hours. In the present disclosure, unless otherwise specified, the treatment time refers to the period of time, for which the treated material is within the above-mentioned treatment temperature ranges.

Preferably, the manner for the secondary thermal activation treatment includes: in an inert atmosphere, increasing the temperature from the ambient temperature at a rate of from 0.5 to 10° C. per minute, and preferably from 0.5 to 1.5° C. per minute, to 200 to 300° C., maintaining for 1 to 10 hours, further increasing the temperature at a rate of from 0.5 to 10° C. per minute, and preferably from 0.5 to 1.5° C. per minute, to 400 to 900° C., preferably 500 to 700° C., and more preferably 550 to 650° C., and maintaining for 2 to 10 hours.

Preferably, the treatment conditions for the primary thermal activation treatment are the same as the treatment conditions for the secondary thermal activation treatment.

In a preferred embodiment of the present disclosure, the operation of the thermal activation treatment includes:

performing the primary thermal activation treatment in nitrogen atmosphere by heating from the ambient temperature at a rate of from 0.5 to 10° C. per minute, and preferably from 0.5 to 1.5° C. per minute, to 200 to 300° C.; maintaining for 1 to 10 hours; further heating at a rate of from 0.5 to 10° C. per minute, and preferably from 0.5 to 1.5° C. per minute, to 400 to 900° C., preferably 500 to 700° C., and more preferably 550 to 650° C.; and maintaining at that temperature for 2 to 10 hours;

then cooling to the ambient temperature (such as room temperature);

performing the secondary thermal activation treatment in nitrogen atmosphere by heating from the ambient temperature at a rate of from 0.5 to 10° C. per minute, and preferably from 0.5 to 1.5° C. per minute, to 200 to 300° C.; maintaining for 1 to 10 hours; further heating at a rate of from 0.5 to 10° C. per minute, and preferably from 0.5 to 1.5° C. per minute, to 400 to 900° C., preferably 500 to 700° C., and more preferably 550 to 650° C.; and maintaining at that temperature for 2 to 10 hours; and cooling to the room temperature, to obtain the sphere-like super-macroporous mesoporous material.

During the primary thermal activation treatment and the secondary thermal activation treatment, the nitrogen atmosphere is always maintained.

In the present disclosure, the filtration process may include after filtration, repeatedly washing with deionized water (the washing may be performed 2 to 10 times), and then performing suction filtration.

In the present disclosure, the drying can be performed in a drying box. Drying conditions may include a temperature of 110° C. to 150° C. and a time of 3 to 6 hours.

According to a preferred embodiment of the present disclosure, the method further comprises mixing via stirring the product obtained by the thermal activation treatment with a chlorine-containing silane.

In the present disclosure, the modification of the mesoporous material with the chlorine-containing silane is accomplished by the mixing via stirring the product obtained by the thermal activation treatment with the chlorine-containing silane so that the prepared sphere-like super-macroporous mesoporous material has the characteristics of lipophilicity, thereby further ensuring that the mesoporous material is in a state of low moisture content and low oxygen content for a long time.

According to the present disclosure, the chlorine-containing silane refers to various substances that comprise carbon, chlorine, and silicon, with or without an oxygen atom, and that do not comprise a hydrophilic group such as hydroxyl, amino, and carboxyl groups. The chlorine-containing silane may comprise one or more chlorine atoms, and one or more silicon atoms. When multiple chlorine atoms are comprised in a chlorine-containing silane, the multiple chlorine atoms can be located on one silicon atom or on multiple silicon atoms. The chlorine-containing silane may be at least one selected from dichlorodimethoxysilane, monochlorotrimethoxysilane, dichlorodiethoxysilane and monochlorotriethoxysilane.

The mesoporous material obtained by the above-described method has the characteristics of small particle size and uniform particle size. Therefore, the thermally activated mesoporous material obtained by the inventive method does not need to undergo the grinding step used in the prior art. In this way, the inventive method can not only save the process step, but also reduce the damage to the structure of the mesoporous material caused by the grinding, reduce the loss of the mesoporous material, and ensure the mechanical strength of the mesoporous material. More importantly, the ball milling used in the prior art will directly damage the pores of the mesoporous material carrier or even cause the blocking of the pores of the mesoporous material carrier with slag, leading to a decrease in catalyst activity.

In a specific embodiment of the present disclosure, the mesoporous material can be prepared by a method comprising the steps of:

Step 1: adding a triblock copolymer, polyoxyethylene-polyoxypropylene-polyoxyethylene ($EO_{20}PO_{70}EO_{20}$, abbreviated as P123), and ammonium fluoride ($NH_4F$) to an aqueous hydrochloric acid solution at a molar ratio of the triblock copolymer:ammonium fluoride:hydrogen chloride=1:1 to 3:100 to 2000, and stirring at a temperature of 25 to 60° C. until the solids are dissolved;

Step 2: adding ethyl orthosilicate and heptane to the solution from Step 1 at a molar ratio of the triblock copolymer:ethyl orthosilicate:heptane=1:20 to 500:20 to 500, stirring vigorously at a temperature of 25 to 60° C. for 10 minutes or more, and then leaving the resulting mixture stand still at a temperature of 25 to 60° C. for 10 hours or more;

Step 3: placing the solution from Step 2 in a closed reaction vessel and allowing it to crystallize at a temperature of 90 to 180° C. for 10 h to 40 h;

Step 4: diluting the crystallization product from Step 3 with deionized water, filtering, washing, and drying, to obtain a raw powder of the sphere-like super-macroporous mesoporous material;

Step 5: calcining the obtained raw powder of the mesoporous material in an oxygen-containing atmosphere such as air at 300 to 600° C. for 8 to 20 hours, to remove the template agent;

Step 6: performing a primary thermal activation treatment by, under a nitrogen gas flow, heating the above template agent-removed material from the ambient temperature at a rate of 0.5 to 10° C. per minute, and preferably 0.5 to 1.5° C. per minute, to 200 to 300° C.; maintaining for 1 to 10 hours; further heating at a rate of 0.5 to 10° C. per minute, and preferably 0.5 to 1.5° C. per minute, to 400 to 900° C., preferably 500 to 700° C., and more preferably 550 to 650° C.; and maintaining at that temperature for 2 to 10 hours;

Step 7: after cooling the above primary thermal activation treated material to room temperature, performing a secondary thermal activation treatment by, under a nitrogen gas flow, heating from the ambient temperature at a rate of 0.5 to 10° C. per minute, and preferably 0.5 to 1.5° C. per minute, to 200 to 300° C.; maintaining for 1 to 10 hours; further heating at a rate of 0.5 to 10° C. per minute, and preferably 0.5 to 1.5° C. per minute, to 400 to 900° C., preferably 500 to 700° C., and more preferably 550 to 650° C.; and maintaining at that temperature for 2 to 10 hours, to obtain the sphere-like super-macroporous mesoporous material.

In a third aspect, the present disclosure provides a sphere-like mesoporous material prepared by the above-described preparation method.

In the present disclosure, the sphere-like mesoporous material has a two-dimensional hexagonal ordered channel structure. The mesoporous material has an average pore diameter of from 10 nm to 15 nm, a specific surface area of from 300 m$^2$/g to 400 m$^2$/g, an average particle size of from 1 μm to 3 μm; the mass content of water in the mesoporous material is less than 1 ppm, preferably less than 0.5 ppm, and more preferably less than 0.1 ppm, and the mass content of oxygen in the mesoporous material is less than 1 ppm, preferably less than 0.5 ppm, and more preferably less than 0.1 ppm, based on the total mass of the mesoporous material.

In a fourth aspect, the present disclosure provides a polyolefin catalyst comprising a carrier and, supported on the carrier, a magnesium component, a titanium component and an optional electron donor component, wherein the carrier is the aforementioned sphere-like mesoporous material.

The polyolefin catalyst of the present disclosure comprises the sphere-like super-macroporous mesoporous material as a carrier. The sphere-like super-macroporous mesoporous material carrier has a specific two-dimensional hexagonal structure. The mesoporous channel structure of the mesoporous material is evenly distributed and has a suitable pore size, and the mesoporous material has a small particle size, a good mechanical strength, and a good structural stability, and is particularly conducive to the good dispersion of magnesium- and titanium-based active components on the surface of the carrier, so that the prepared polyolefin catalyst not only has the advantages of supported catalysts such as good dispersion of metal active components, high loading, few side reactions, simple post-treatment, etc., but also has a higher catalytic activity so as to ensure that, when used in the polymerization of olefin monomers, the supported catalyst made by using the sphere-like super-macroporous mesoporous material as a carrier has better catalytic activity and significantly improved conversion of the raw materials.

According to the present disclosure, based on the total weight of the polyolefin catalyst, the content of the carrier is 20% to 90% by weight, preferably 30% to 70% by weight; the content of the magnesium component in terms of magnesium element is 1% to 50% by weight, preferably 1% to 30% by weight; and the content of the titanium component in terms of titanium element is 1% to 50% by weight, preferably 1% to 30% by weight.

According to the present disclosure, when the active metal component supported by the carrier in the polyolefin catalyst comprises only the magnesium component, the content of the carrier may be 20% to 90% by weight, and the content of the magnesium component may be 1% to 50% by weight, preferably 1% to 30% by weight, more preferably 1% to 20% by weight, based on the total weight of the polyolefin catalyst; when the active metal component supported by the carrier in the polyolefin catalyst comprises only the titanium component, the content of the carrier may be 20% to 90% by weight, and the content of the titanium component may be 1% to 50% by weight, preferably 1% to 15% by weight, more preferably 1% to 5% by weight, based on the total weight of the polyolefin catalyst.

Preferably, in the polyolefin catalyst, a molar ratio of the magnesium component (in terms of magnesium element) to the titanium component (in terms of titanium element) is 0.5-50:1, preferably 5-18:1.

According to the present disclosure, the polyolefin catalyst may have a pore volume of from 0.5 mL/g to 1 mL/g, a specific surface area of from 120 m$^2$/g to 300 m$^2$/g, a most probable pore diameter of from 7 nm to 12 nm, an average particle size of from 3 μm to 25 μm, and a particle size distribution value of from 0.85 to 0.95.

In the present disclosure, the average particle size and the particle size distribution, SPAN value, of the polyolefin catalyst are measured by a Malvern laser particle size analyzer, and the specific surface area, the pore volume, the average pore diameter, and the most probable pore diameter are measured by nitrogen adsorption.

In an embodiment of the present disclosure, the polyolefin catalyst component comprises the sphere-like super-macroporous mesoporous material, magnesium, titanium, a halogen and an electron donor. In the present disclosure, said halogen refers to at least one of fluorine, chlorine, bromine and iodine.

In a fifth aspect, the present disclosure provides a method for preparing the above-described polyolefin catalyst, comprising:

(i) under an inert atmosphere, (ia) conducting impregnation treatment of the above-described sphere-like mesoporous material with a solution containing a magnesium component and then with a solution containing a titanium component, (ib) conducting impregnation treatment of the above-described mesoporous material with a solution containing a titanium component and then with a solution containing a magnesium component, or (ic) conducting co-impregnation treatment of the above-described mesoporous material with a solution containing both a titanium component and a magnesium component, to obtain a slurry; and (ii) spray drying the slurry from step (i).

According to the present disclosure, the solution containing a magnesium component and/or a titanium component may be a solution containing a magnesium salt and/or a titanium salt in an organic solvent, and the organic solvent may be an electron donor solvent. For instance, the organic solvent may be selected from the group consisting of alkyl esters of aliphatic or aromatic carboxylic acids, aliphatic ethers and cyclic ethers, preferably at least one of $C_1$-$C_4$ alkyl esters of $C_1$-$C_4$ saturated aliphatic carboxylic acids, $C_1$-$C_4$ alkyl esters of $C_7$-$C_8$ aromatic carboxylic acids, $C_2$-$C_6$ aliphatic ethers and $C_3$-$C_4$ cyclic ethers, more preferably at least one of methyl formate, ethyl formate, methyl acetate, ethyl acetate, butyl acetate, diethyl ether, dihexyl ether and tetrahydrofuran (THF), and even more preferably tetrahydrofuran.

According to the present disclosure, the supporting of the magnesium component and/or the titanium component on the mesoporous material may be accomplished through impregnation, wherein the magnesium component and/or the titanium component enter the channels of the mesoporous material by virtue of the capillary pressure of the channel structure of the carrier and, at the same time, the magnesium component and/or the titanium component will also be adsorbed on the surface of the mesoporous material until the magnesium component and/or the titanium component reaches adsorption equilibrium on the surface of the mesoporous material. In the case where the mesoporous material supports both the magnesium component and the titanium component, the impregnation treatment may be a co-impregnation treatment or a stepwise impregnation treatment. In order to save preparation costs and simplify the experimental process, the impregnation treatment is preferably a co-impregnation treatment. Further preferably, the conditions for the co-impregnation treatment may include: the conditions for the impregnation treatment may include an impregnation temperature of 25 to 100° C., preferably 40 to 80° C., and an impregnation time of 0.1 to 5 h, preferably 1 to 4 h.

According to the present disclosure, the amounts of the mesoporous material, the magnesium component and the titanium component used are preferably such that in the prepared polyolefin catalyst component, based on the total weight of the polyolefin catalyst component, the content of the mesoporous material ranges from 20 to 90 wt. %, preferably from 30 to 70 wt. %, the content of the magnesium component in terms of magnesium element ranges from 1 to 50 wt. %, preferably from 1 to 30 wt. %, more preferably from 10 to 30 wt. %, and the content of the titanium component in terms of titanium element ranges from 1 to 50 wt. %, preferably from 1 to 30 wt. %, more preferably from 10 to 30 wt. %.

In the present disclosure, in the case where the mesoporous material is impregnated in a solution containing only the magnesium component, the amounts of the mesoporous material and the magnesium component used are preferably such that in the prepared polyolefin catalyst component, based on the total weight of the polyolefin catalyst component, the content of the mesoporous material ranges from 20 to 90 wt. %, and the content of the magnesium component (in terms of magnesium element) ranges from 1 to 50 wt. %, preferably from 1 to 30 wt. %, and more preferably from 1 to 20 wt. %.

In a specific embodiment of the present disclosure, in the prepared polyolefin catalyst component, based on the total weight of the polyolefin catalyst component, the content of the mesoporous material ranges from 20 to 90 wt. %, and the sum of the content of the magnesium component in terms of magnesium element and the content of the titanium component in terms of titanium element ranges from 10 to 30 wt. %.

Preferably, in step (i), a weight ratio of the mesoporous material to the solution containing the magnesium component and/or the titanium component may be 1:50 to 150, and preferably 1:75 to 120.

Preferably, in step (i), the amounts of the magnesium component and the titanium component used are such that in the prepared polyolefin catalyst component, a molar ratio of the magnesium component in terms of magnesium element to the titanium component in terms of titanium element ranges from 0.5 to 50:1, and preferably from 5 to 18:1.

In the disclosure, the magnesium component may a magnesium compound of formula $Mg(OR^1)_m X_{2-m}$, wherein $R^1$ is a hydrocarbon group having 2 to 20 carbon atoms, for example, a $C_2$-$C_{10}$ alkyl, X is a halogen atom, and $0 \leq m \leq 2$. For example, the magnesium component may be at least one of diethoxy magnesium, dipropoxy magnesium, dibutoxy magnesium, dioctoxy magnesium, and magnesium dichloride.

In the disclosure, the titanium component may be a titanium compound of formula $Ti(OR^2)_n X_{4-n}$, wherein $R^2$ is a hydrocarbon group having 1 to 20 carbon atoms, for example, a $C_1$-$C_{10}$ alkyl, X is a halogen atom, and $0 \leq n \leq 4$, and/or titanium trichloride. For example, the titanium component may be at least one of tetraethyl titanate, tetramethyl titanate, tetrabutyl titanate, tetraisopropyl titanate, titanium trichloride, and titanium tetrachloride. Preferably, the titanium component is titanium tetrachloride and/or titanium trichloride, and more preferably titanium tetrachloride.

In the method of the present disclosure, a magnesium component precursor that can be converted into the above-described magnesium component during the preparation of the catalyst component can be used in place of the magnesium component, and/or a titanium component precursor that can be converted into the above-described titanium component during the preparation of the catalyst component can be used in place of the titanium component.

In the present disclosure, there are not particular limitations to the concentrations of the magnesium component and the titanium component in the solution containing the magnesium component and/or the titanium component. For example, the concentrations of the magnesium component and the titanium component may be those conventionally selected in the art. For instance, the concentration of the magnesium component may range from 0.1 to 1 mol/L, and the concentration of the titanium component may range from 0.01 to 0.2 mol/L.

According to the present disclosure, the inert gas used in the impregnation treatment is a gas that does not react with the raw materials and products. For example, it may be at least one of nitrogen and gases of Group zero of the element Periodic Table conventionally used in the art, and preferably nitrogen. In the present disclosure, the conditions for the impregnation include an impregnation temperature of 25 to 100° C., and an impregnation time of 0.1 to 5 hours.

According to the present disclosure, the spray drying may be carried out according to conventional processes. For example, the spray drying method may be at least one selected from pressure spray drying methods, centrifugal spray drying methods, and gas-flow spray drying methods. According to a preferred embodiment of the present disclosure, the spray drying is accomplished through a gas-flow spray drying method. The spray drying can be performed in an atomizer. The spray drying conditions may include: under a protective atmosphere of nitrogen or argon, a gas inlet temperature of 100 to 150° C., a gas outlet temperature of 100 to 120° C., and a carrying gas flow rate of 10 to 50 L/s. The above conditions can impart relatively high viscosity to the slurry to be sprayed, making it suitable for spray molding operations, and impart good mechanical strength to the particles obtained by spraying. Preferably, the spray drying conditions are such that the prepared polyolefin catalyst has an average particle size of from 3 to 25 μm, and a particle size distribution value of 0.85 to 0.95.

According to a preferred embodiment of the disclosure, steps (i)-(ii) are performed as follows: under an inert atmosphere, in a reactor equipped with agitation, electron donor solvent tetrahydrofuran (THF) is added and the reactor temperature is controlled to 25 to 40° C. Magnesium dichloride and titanium tetrachloride are added quickly after the stirring is turned on. The system temperature is adjusted to 60 to 75° C. and the mixture is allowed to react at the constant temperature for 1-5 hours until the magnesium dichloride and titanium tetrachloride are completely dissolved, resulting in an organic solution containing magnesium dichloride and titanium tetrachloride. The organic solution containing magnesium dichloride and titanium tetrachloride is mixed with the sphere-like mesoporous material, and the amounts of the individual components are controlled to be: relative to 1 mole of titanium element, 0.5 to 50 moles, preferably 1 to 10 moles for magnesium element, and 0.5 to 200 moles, preferably 20 to 200 moles for the electron donor solvent tetrahydrofuran (THF). The resultant mixture is stirred at a reactor temperature controlled at 60 to 75° C. for 0.1 to 5 hours to obtain a uniform slurry to be sprayed. The sphere-like mesoporous material should be added in an amount sufficient to form a slurry suitable for spray molding, and the sum of the contents of magnesium dichloride and titanium tetrachloride in terms of magnesium element and titanium element, respectively, is 1 to 50% by weight, preferably 1 to 30% by weight. Then, the obtained slurry to be sprayed is introduced into a spray dryer operated under $N_2$ atmosphere, where the gas inlet temperature is controlled to 100 to 150° C., the gas outlet temperature is controlled to 100 to 120° C., and the carrying gas flow rate is controlled to 10 to 50 L/s, to obtain sphere-like polyolefin catalyst particles with an average particle size of 3 to 25 μm, preferably 3 to 20 μm.

The polyolefin catalyst prepared by the above-described method has sphere-like morphological characteristics, so it is sometimes conveniently referred to as a sphere-like catalyst component. The term "sphere-like catalyst component" as used herein means that the catalyst component has a particle morphology close to sphere. The catalyst of the present disclosure has high loadings of the magnesium component and the titanium component and a reasonable channel structure. When the catalyst of the present disclosure is used in the polymerization of olefin monomers, the polymerization activity is higher, and the resulting polymer has a good particle morphology, a narrow molecular weight distribution, and excellent flowability.

In the present disclosure, when the catalyst is used in ethylene polymerization, the catalyst efficiency (gPF/gcat·h) can be greater than 25,000, preferably 28,000 to 29,000. In contrast, the catalytic efficiency of the catalysts of the prior art does not exceed 22,000, and usually does not exceed 20,000.

In the present disclosure, the mesoporous material as a carrier used in the polyolefin catalyst has an average pore diameter much larger than that of conventional mesoporous materials, and this helps the polyethylene catalyst to enter its abundant internal pores during the supporting process, rather than just to support on the outer surface, and the hexagonal straight channels are also more conducive to the entry of the catalyst, so that the obtained catalyst has excellent catalytic efficiency.

In a sixth aspect, the present disclosure provides a method for olefin polymerization, comprising a) polymerizing olefin monomer(s) in the presence of the above-described polyolefin catalyst and a cocatalyst under polymerization conditions to provide a polyolefin; and b) recovering the polyolefin.

The term "polymerization" as used herein includes homopolymerization and copolymerization.

The term "polymer" as used herein includes homopolymers, copolymers and terpolymers.

The polymerization reactions of olefin monomers to prepare polyolefins, in which the polyolefin catalyst component of the present disclosure is used, include homopolymerization of ethylene and copolymerization of ethylene with other α-olefins, wherein the α-olefins can be at least one selected from propylene, 1-butene, 1-hexene, 1-octene, 1-pentene, and 4-methyl-1-pentene.

According to the present disclosure, the reaction conditions of the polymerization are not particularly limited, and may be conventional reaction conditions for olefin polymerization in the art. For example, the reaction may be carried out under an inert atmosphere, and the conditions for the polymerization may include: a temperature of 10 to 100° C., a time of 0.5 to 5 h, and a pressure of 0.1 to 2 MPa; preferably, the conditions for the polymerization may include: a temperature of 20 to 95° C., a time of 1 to 4 h, and a pressure of 0.5 to 1.5 MPa; further preferably, a temperature of 70 to 85° C., a time of 1 to 2 h, and a pressure of 1 to 1.5 MPa.

The polyethylene particles obtained by the olefin polymerization method according to the present disclosure have good morphology and excellent flowability, the melt index of the polymer powder is relatively large, and the molecular weight distribution of the polymer powder is narrow. Preferably, the melt index MI2.16 (g/10 min) of the polyethylene powder is greater than 1.6 g/10 min, preferably from 1.7 to 3 g/10 min; the molecular weight distribution index of the polyethylene powder (Mw/Mn) is less than 3.5, preferably from 2.8 to 3.

The pressures mentioned herein refer to gauge pressure.

In the present disclosure, the polymerization may be carried out in the presence of a solvent. The solvent that can be used in the polymerization is not particularly limited, and it may be hexane, for example.

In a specific embodiment of the present disclosure, the supported polyolefin catalyst component may be a supported polyethylene catalyst component, and the polymerization is an ethylene polymerization. The method for polymerizing ethylene comprises polymerizing ethylene under ethylene polymerization conditions in the presence of a catalyst and a cocatalyst, and the cocatalyst is preferably an alkyl aluminum compound.

The cocatalyst that can be used in the method of the present disclosure may be any cocatalyst commonly used in the art. For example, the cocatalyst may be an alkyl aluminum compound represented by formula I:

$$AlR_nX_{(3-n)} \qquad \text{Formula I}$$

wherein R may each be a $C_1$-$C_8$ alkyl, preferably a $C_1$-$C_5$ alkyl; X may each be one of halogen atoms, preferably chlorine atom; and n is 0, 1, 2 or 3.

Preferably, the $C_1$-$C_5$ alkyl may be one or more of methyl, ethyl, n-propyl, isopropyl, n-butyl, sec-butyl, isobutyl, tert-butyl, n-pentyl, isopentyl, tert-amyl, and neopentyl.

Examples of the alkyl aluminum compound include, but are not limited to, trimethyl aluminum, dimethyl aluminum chloride, triethyl aluminum, diethyl aluminum chloride, tri-n-propyl aluminum, di-n-propyl aluminum chloride, tri-n-butyl aluminum, tri-sec-butyl aluminum, tri-tert-butyl aluminum, di-n-butyl aluminum chloride and diisobutyl aluminum chloride. Most preferably, the alkyl aluminum compound is triethyl aluminum.

The amount of the alkyl aluminum compound used may also be a conventional choice in the art. Generally, a molar ratio of the catalyst component to the alkyl aluminum compound may be 1:20 to 300.

In the present disclosure, the method for olefin polymerization may further comprise, after the completion of polymerization reaction, isolating the final reaction mixture, thereby obtaining a powder of polyolefin particles.

Hereinafter, the present disclosure will be illustrated in detail by the following examples.

In the following examples and comparative examples:

The triblock copolymer of polyoxyethylene-polyoxypropylene-polyoxyethylene, P123, was purchased from Aldrich, abbreviated as P123, and has a molecular formula of $EO_2PO_{70}EO_{20}$ and an average molecular weight, Mn, of 5800, which is the substance with the registration number of 9003-11-6 in the American Chemical Abstracts. The other raw materials used in examples and comparative examples are commercially available.

In the following examples and comparative examples, X-ray diffraction analyses were performed on an X-ray diffractometer model D8 Advance purchased from Bruker AXS, Germany; scanning electron microscope analyses were performed on a scanning electron microscope model XL-30 purchased from FEI, USA; pore structure parameter analyses were performed on an adsorption instrument model ASAP 2020-M+C purchased from Micromeritics Co., USA; specific surface area and pore volume of the samples were calculated by using the BET method; particle size distribution value (SPAN) of the samples was obtained on a Malvern laser particle size analyzer (available from Malvin, UK); the rotary evaporator used was model RV10 digital produced by IKA company, German; the contents of individual components of the polyolefin catalyst components were determined on a wavelength-dispersion X-ray fluorescence spectrometer model Axios-Advanced purchased from Panaco of the Netherlands; and spray drying was carried out on a spray dryer model B-290 manufactured by Buchi, Switzerland. The moisture content of the mesoporous materials was measured by an MA-30 smart Karl Fischer moisture analyzer. The oxygen content of the mesoporous materials was measured by ONH-3000 oxygen, nitrogen and hydrogen analyzer.

The molecular weight distribution (Mw/Mn) of polyolefin powders was measured by using PL-GPC220 gel permeation chromatograph produced by Polymer Laboratories Ltd., British according to the method specified in ASTM D6474-99.

The melt index of polyolefins was determined by the method specified in ASTM D1238-99.

The average particle size of the particulate materials was measured by a scanning electron microscope.

Example 1

This example is used to illustrate a polyolefin catalyst component and its preparation.

(I) Carrier Preparation
  (1) 2.4 grams of P123 (the substance of CAS No. 9003-11-6, having an average molecular weight, Mn, of 5800) and 0.028 grams of ammonium fluoride were added into 80 mL of a hydrochloric acid solution with a concentration of 1.75 mol/L, and stirred at 20° C. until the P123 and the ammonium fluoride were completely dissolved.
  (2) Then, 17 mL of n-heptane and 5.5 mL of ethyl orthosilicate were added into the above solution and stirred vigorously at 20° C. for 4 minutes, and the resulting rection mixture was then leaved stand still for 1 hour.
  (3) The resultant solution was transferred into a polytetrafluoroethylene-lined reactor and allowed to crystallize at 100° C. for 24 hours.
  (4) A raw powder of mesoporous material was obtained through filtering, washing and drying.
  (5) The raw powder of the mesoporous material was calcined in a muffle furnace at 500° C. for 24 hours to remove the template agent. Then, under a nitrogen flow at a flow rate of 1.3 $m^3/s$, the calcined mesoporous material was subjected to a primary thermal activation treatment by heating up from room temperature to 250° C. at a rate of 1° C. per minute, keeping at that temperature for 2 hours, then heating up to 550° C. at a rate of 1° C. per minute, and keeping at that temperature for 8 hours. The temperature was lowered to room temperature. Next, under a nitrogen flow at a flow rate of 13 $m^3/s$, the mesoporous material was subjected to a secondary thermal activation treatment by heating up from room temperature to 250° C. at a rate of 1° C. per minute, keeping at that temperature for 2 hours, then heating up to 550° C. at a rate of 1° C. per minute, and keeping at that temperature for 8 hours. Then, the temperature was lowered to room temperature, to afford a sphere-like super-macroporous mesoporous material B1. Under nitrogen atmosphere, the thermally activated mesoporous material was sampled and then measured on the MA-30 smart Karl Fischer moisture analyzer. No moisture was detected from the sphere-like super-macroporous mesoporous material. Since the MA-30 smart Karl Fischer moisture analyzer has a detection limit of 0.1 ppm (on mass basis), the sphere-like super-macroporous mesoporous material has a moisture content of less than 0.1 ppm. Furthermore, no oxygen gas was detected from the mesoporous material through a measurement made on the ONH-3000 oxygen, nitrogen and hydrogen analyzer under nitrogen atmosphere, which analyzer has a detection limit of 0.1 ppm (on mass basis). This suggests that the sphere-like super-macroporous mesoporous material has an oxygen content of less than 0.1 ppm. 10 g of the above thermally activated mesoporous material B1 was taken into a three-necked flask, and 10 mL of toluene and 5 mL of dichlorodimethylsilane were added thereto. After stirring at 30° C. for 10 hours, the contents were evaporated to dry under nitrogen flow, to afford a sphere-like super-macroporous mesoporous material carrier $C_1$ (10 g).

(II) Preparation of Polyolefin Catalyst
To a reactor equipped with a stirring device that had been purged with $N_2$ and maintained under $N_2$ atmosphere, 130 mL of tetrahydrofuran as electron donor solvent was added. At a reactor temperature controlled at 30° C., 5.3 g of magnesium dichloride and 1 mL of titanium tetrachloride were added into the reactor, and the system temperature was adjusted to 70° C. and maintained at that temperature for 4 hours to obtain a solution containing magnesium dichloride and titanium tetrachloride. The solution was cooled to 50° C., 6 g of the sphere-like super-macroporous mesoporous material carrier $C_1$ was added thereto, and the resultant mixture was stirred for 2 hours to obtain a uniform slurry to be sprayed. Then, the obtained slurry to be sprayed was introduced into a spray dryer, where the slurry was spray dried under $N_2$ atmosphere at a gas inlet temperature of 140° C., a gas outlet temperature of 105° C., and a carrying gas flow rate of 30 IUs, to obtain a polyolefin catalyst component designated as Cat-1.

The sphere-like super-macroporous mesoporous material A1 and the polyolefin catalyst Cat-1 were characterized through XRD, scanning electron microscope, particle size analyzer and nitrogen adsorption instrument model ASAP 2020-M+C.

Through X-ray fluorescence analysis, it was found that in the catalyst component Cat-1 obtained in this example, the magnesium content was 11.17% by weight and the titanium content was 2.55% by weight in terms of elements.

FIG. 1 is an XRD pattern of the sphere-like super-macroporous mesoporous material. It can be seen from the XRD pattern that the mesoporous material has a highly ordered channel structure.

Figure 2:
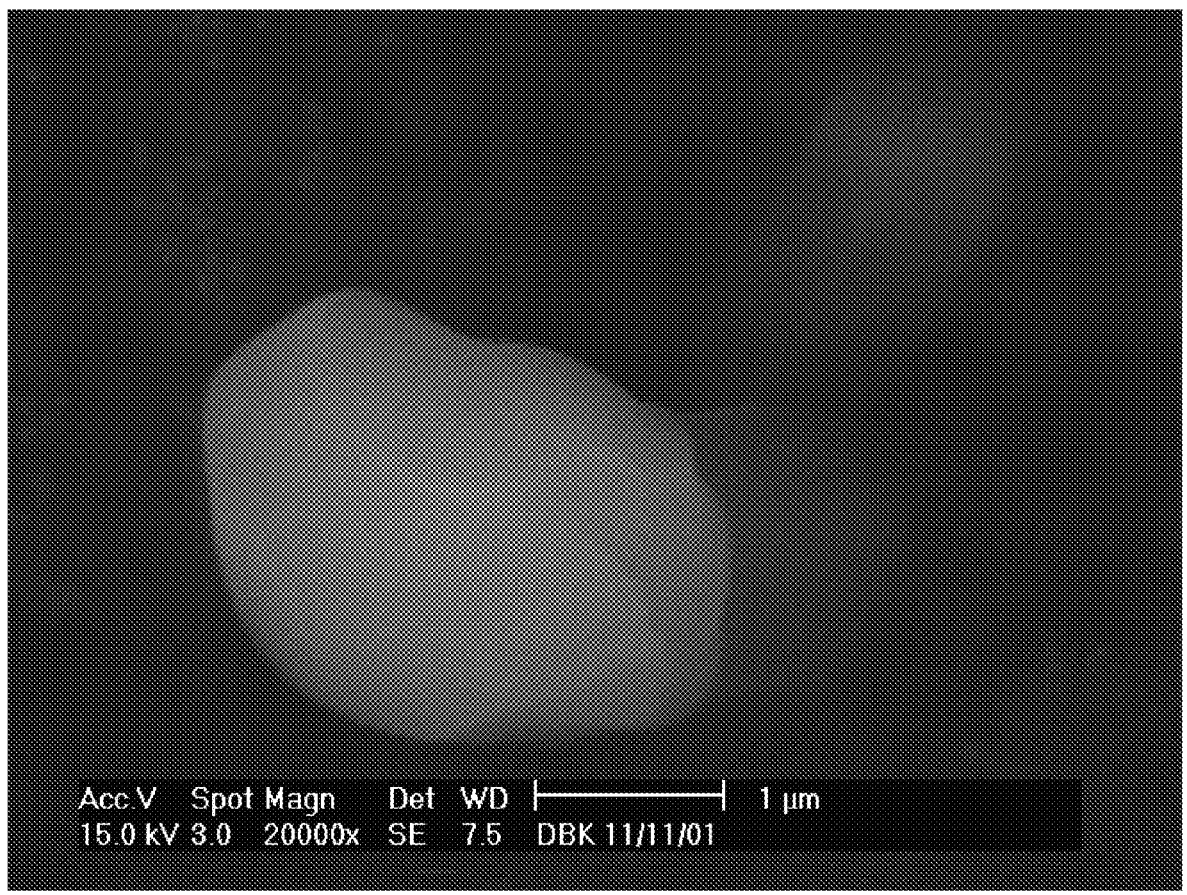
FIG. 2 is a scanning electron microscope (SEM) image of the sphere-like super-macroporous mesoporous material provided by Example 1.

FIG. 2 is a scanning electron microscope (SEM) image (having a magnification of 20000 times) of the sphere-like super-macroporous mesoporous material. It can be seen from the SEM image that the mesoporous material has a sphere-like micromorphology.

Property parameters of the mesoporous material are given in Table 1.

Comparative Example 1

This comparative example is used to illustrate a comparative polyolefin catalyst and its preparation.

(I) Carrier Preparation
A commercially available silica gel (grade TS610 available from Cabot Corporation, having a particle size of 0.02 to 0.1 μm) was used as carrier D1. No moisture was detected from the carrier D1 through a measurement made on the MA-30 smart Karl Fischer moisture analyzer under nitrogen atmosphere, which analyzer has a detection limit of 0.1 ppm (on mass basis). This suggests that the carrier D1 has a moisture content of less than 0.1 ppm. Furthermore, no oxygen gas was detected from the carrier D1 through a measurement made on the ONH-3000 oxygen, nitrogen and hydrogen analyzer under nitrogen atmosphere, which analyzer has a detection limit of 0.1 ppm (on mass basis). This suggests that the carrier D1 has an oxygen gas content of less than 0.1 ppm.

(II) Preparation of Polyolefin Catalyst

A polyolefin catalyst, designated as comparative catalyst Cat-D-1, was prepared by following the procedure as described in Example 1, except that the same weight of the above silica gel carrier D1 was used instead of the sphere-like super-macroporous mesoporous material carrier C1.

It was found that in the catalyst Cat-D-1, the magnesium content was 15.3% by weight and the titanium content was 2.5% by weight in terms of elements.

Comparative Example 2

This comparative example is used to illustrate a comparative polyolefin catalyst and its preparation.

A carrier D2 and a polyolefin catalyst Cat-D-2 were prepared by following the procedure as described in Example 1, except that the same weight of an alumina carrier was used instead of the sphere-like super-macroporous mesoporous material carrier C1.

Through X-ray fluorescence analysis, it was found that in the catalyst Cat-D-2, the magnesium content was 14.6% by weight and the titanium content was 1.8% by weight in terms of elements.

Comparative Example 3

This comparative example is used to illustrate a comparative polyolefin catalyst and its preparation.

A polyolefin catalyst Cat-D-3 was prepared by following the procedure as described in Example 1, except that no spray drying and no organic modification treatment were used during the preparation of the polyolefin catalyst Cat-D-3, but after the impregnation treatment the mixture was directly filtered, washed with n-hexane 4 times, and dried at 75° C., to obtain the polyolefin catalyst Cat-D-3.

Through X-ray fluorescence analysis, it was found that in the catalyst Cat-D-3, the magnesium content was 11.13% by weight and the titanium content was 1% by weight in terms of elements.

Example 2

(I) Carrier Preparation
  (1) 2.4 grams of P123 (the substance of CAS No. 9003-11-6, having an average molecular weight, Mn, of 5800) and 0.01 grams of ammonium fluoride were added into 80 mL of a hydrochloric acid solution with a concentration of 1.75 mol/L, and stirred at 20° C. until the P123 and the ammonium fluoride were completely dissolved.
  (2) Then, 1 mL of n-heptane and 5.5 mL of ethyl orthosilicate were added into the above solution and stirred vigorously at 20° C. for 4 minutes, and the resulting rection mixture was then leaved stand still for 1 hour.
  (3) The resultant solution was transferred into a polytetrafluoroethylene-lined reactor and allowed to crystallize at 100° C. for 24 hours.
  (4) A raw powder of mesoporous material was obtained through filtering, washing and drying.
  (5) The raw powder of the mesoporous material was calcined in a muffle furnace at 500° C. for 24 hours to remove the template agent. Then, under a nitrogen flow at a flow rate of 1.3 $m^3$/s, the calcined mesoporous material was subjected to a primary thermal activation treatment by heating up from room temperature to 250° C. at a rate of 1° C. per minute, keeping at that temperature for 2 hours, then heating up to 550° C. at a rate of 1° C. per minute, and keeping at that temperature for 8 hours. The temperature was lowered to room temperature. Next, under a nitrogen flow at a flow rate of 1.3 $m^3$/s, the mesoporous material was subjected to a secondary thermal activation treatment by heating up from room temperature to 250° C. at a rate of 1° C. per minute, keeping at that temperature for 2 hours, then heating up to 550° C. at a rate of 1° C. per minute, and keeping at that temperature for 8 hours. Then, the temperature was lowered to room temperature, to afford a sphere-like super-macroporous mesoporous material B2. No moisture was detected from the sphere-like super-macroporous mesoporous material through a measurement made on the MA-30 smart Karl Fischer moisture analyzer under nitrogen atmosphere, which analyzer has a detection limit of 0.1 ppm (on mass basis). This suggests that the sphere-like super-macroporous mesoporous material has a moisture content of less than 0.1 ppm. Furthermore, no oxygen gas was detected from the mesoporous material through a measurement made on the ONH-3000 oxygen, nitrogen and hydrogen analyzer under nitrogen atmosphere, which analyzer has a detection limit of 0.1 ppm (on mass basis). This suggests that the sphere-like super-macroporous mesoporous material has an oxygen content of less than 0.1 ppm. 10 g of the above thermally activated mesoporous material B2 was taken into a three-necked flask, and 10 mL of toluene and 5 mL of dichlorodimethylsilane were added thereto. After stirring at 30° C. for 10 hours, the contents were evaporated to dry under nitrogen flow, to afford a sphere-like super-macroporous mesoporous material carrier $C_2$ (10 g).

(II) Preparation of Polyolefin Catalyst
  A polyolefin catalyst Cat-2 was prepared by following the procedure as described in Example 1.

Example 3

(I) Carrier Preparation
  (1) 2.4 grams of P123 (the substance of CAS No. 9003-11-6, having an average molecular weight, Mn, of 5800) and 3 grams of ammonium fluoride were added into 80 mL of a hydrochloric acid solution with a concentration of 1.75 mol/L, and stirred at 20° C. until the P123 and the ammonium fluoride were completely dissolved.
  (2) Then, 100 mL of n-heptane and 5.5 mL of ethyl orthosilicate were added into the above solution and stirred vigorously at 20° C. for 4 minutes, and the resulting rection mixture was then leaved stand still for 1 hour.
  (3) The resultant solution was transferred into a polytetrafluoroethylene-lined reactor and allowed to crystallize at 100° C. for 24 hours.
  (4) A raw powder of mesoporous material was obtained through filtering, washing and drying.
  (5) The raw powder of the mesoporous material was calcined in a muffle furnace at 500° C. for 24 hours to remove the template agent. Then, under a nitrogen flow at a flow rate of 1.3 $m^3$/s, the calcined mesoporous material was subjected to a primary thermal activation treatment by heating up from room temperature to 250° C. at a rate of 1° C. per minute, keeping at that temperature for 2 hours, then heating up to 550° C. at a rate of 1° C. per minute, and keeping at that temperature for 8 hours. The temperature was lowered to room temperature. Next, under a nitrogen flow at a flow rate of 1.3 m³/s, the mesoporous material was subjected to a secondary thermal activation treatment by heating up from room temperature to 250° C. at a rate of 1° C. per minute, keeping at that temperature for 2 hours, then heating up to 550° C. at a rate of 1° C. per minute, and keeping at that temperature for 8 hours. Then, the temperature was lowered to room temperature, to afford a sphere-like super-macroporous mesoporous material B3. No moisture was detected from the sphere-like super-macroporous mesoporous material through a measurement made on the MA-30 smart Karl Fischer moisture analyzer under nitrogen atmosphere, which analyzer has a detection limit of 0.1 ppm (on mass basis). This suggests that the sphere-like super-macroporous mesoporous material has a moisture content of less than 0.1 ppm. Furthermore, no oxygen gas was detected from the mesoporous material through a measurement made on the ONH-3000 oxygen, nitrogen and hydrogen analyzer under nitrogen atmosphere, which analyzer has a detection limit of 0.1 ppm (on mass basis). This suggests that the sphere-like super-macroporous mesoporous material has an oxygen content of less than 0.1 ppm. 10 g of the above thermally activated mesoporous material B3 was taken into a three-necked flask, and 10 mL of toluene and 5 mL of dichlorodimethylsilane were added thereto. After stirring at 30° C. for 10 hours, the contents were evaporated to dry under nitrogen flow, to afford a sphere-like super-macroporous mesoporous material carrier $C_3$ (10 g).

(II) Preparation of Polyolefin Catalyst

A polyolefin catalyst Cat-3 was prepared by following the procedure as described in Example 1.

Example 4

A polyolefin catalyst component was prepared by following the procedure as described in Example 1, except that in step (5) of (I) carrier preparation, the mesoporous material obtained after the thermal activation treatment was ball milled under nitrogen-free conditions, to afford a sphere-like super-macroporous mesoporous material carrier C4. No moisture was detected from the sphere-like super-macroporous mesoporous material through a measurement made on the MA-30 smart Karl Fischer moisture analyzer under nitrogen atmosphere, which analyzer has a detection limit of 0.1 ppm (on mass basis). This suggests that the sphere-like super-macroporous mesoporous material has a moisture content of less than 0.1 ppm. Furthermore, no oxygen gas was detected from the mesoporous material through a measurement made on the ONH-3000 oxygen, nitrogen and hydrogen analyzer under nitrogen atmosphere, which analyzer has a detection limit of 0.1 ppm (on mass basis). This suggests that the sphere-like super-macroporous mesoporous material has an oxygen content of less than 0.1 ppm.

(II) Preparation of Polyolefin Catalyst

A polyolefin catalyst Cat-4 was prepared by following the procedure as described in Example 1.

Example 5

A polyolefin catalyst component was prepared by following the procedure as described in Example 1, except that in (I) carrier preparation, 0.046 grams of ammonium fluoride was used, to afford a sphere-like super-macroporous mesoporous material carrier $C_5$. No moisture was detected from the sphere-like super-macroporous mesoporous material through a measurement made on the MA-30 smart Karl Fischer moisture analyzer under nitrogen atmosphere, which analyzer has a detection limit of 0.1 ppm (on mass basis). This suggests that the sphere-like super-macroporous mesoporous material has a moisture content of less than 0.1 ppm. Furthermore, no oxygen gas was detected from the mesoporous material through a measurement made on the ONH-3000 oxygen, nitrogen and hydrogen analyzer under nitrogen atmosphere, which analyzer has a detection limit of 0.1 ppm (on mass basis). This suggests that the sphere-like super-macroporous mesoporous material has an oxygen content of less than 0.1 ppm.

A polyolefin catalyst Cat-5 was prepared by following the procedure as described in Example 1.

Example 6

A polyolefin catalyst component was prepared by following the procedure as described in Example 1, except that in (I) carrier preparation, 28 mL of heptane was used, to afford a sphere-like super-macroporous mesoporous material carrier $C_6$. No moisture was detected from the sphere-like super-macroporous mesoporous material through a measurement made on the MA-30 smart Karl Fischer moisture analyzer under nitrogen atmosphere, which analyzer has a detection limit of 0.1 ppm (on mass basis). This suggests that the sphere-like super-macroporous mesoporous material has a moisture content of less than 0.1 ppm. Furthermore, no oxygen gas was detected from the mesoporous material through a measurement made on the ONH-3000 oxygen, nitrogen and hydrogen analyzer under nitrogen atmosphere, which analyzer has a detection limit of 0.1 ppm (on mass basis). This suggests that the sphere-like super-macroporous mesoporous material has an oxygen content of less than 0.1 ppm.

A polyolefin catalyst Cat-6 was prepared by following the procedure as described in Example 1.

Comparative Example 4

(I) Carrier Preparation 2 grams of template agent F127 were added into a solution of 2.9 g of 37 wt. % hydrochloric acid in 56 g of water, and the resulting mixture was stirred at 40° C. until the F127 was completely dissolved. Then, 8.2 grams (0.04 mol) of ethyl orthosilicate were added into the above solution and stirred at 40° C. for 45 minutes, and the resultant solution was then transferred into a polytetrafluoroethylene-lined reactor and allowed to crystallize at 100° C. for 24 hours. Next, a raw powder of a mesoporous material with a body-centered cubic structure was obtained through filtering, washing with deionized water 4 times, suction filtering and drying. The raw powder of the mesoporous material with body-centered cubic structure was calcined in a muffle furnace at 400° C. for 10 hours to remove the template agent, to obtain a template agent-removed spherical mesoporous silica D4 with an average particle size ranging from 3 to 9 μm. Then, the template agent-removed spherical mesoporous silica D4 was thermally activated by calcining under nitrogen atmosphere at 400° C. for 10 h to remove the hydroxyl groups and residual moisture from the spherical mesoporous silica D4, thereby obtaining thermally activated spherical mesoporous silica. Under nitrogen atmosphere, the thermally activated mesoporous material was sampled and then measured on the MA-30 smart Karl Fischer moisture analyzer. It was found that the sphere-like super-macroporous mesoporous material has a moisture content of 500 ppm (on mass basis). Furthermore, it was found through the ONH-3000 oxygen, nitrogen and hydrogen analyzer that the mesoporous material has an oxygen content of 300 ppm (on mass basis).

10 g of the above thermally activated spherical mesoporous silica D4 and 1 g of dichlorodimethylsilane were taken into a 100 mL ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 25° C. and a rotary speed of the ball mill jar of 400 r/min for 12 hours, to obtain a spherical mesoporous silica carrier D4, which has a body-centered cubic structure and an average particle size ranging from 3 to 8 µm.

(II) Preparation of Polyolefin Catalyst

A polyolefin catalyst Cat-D-4 was prepared by following the procedure as described in Example 1.

Comparative Example 5

(I) Carrier Preparation 1 gram of a triblock copolymer of polyethylene glycol-polyglycerol-polyethylene glycol, P123, and 1.69 grams of ethanol were added into 28 mL of a buffer solution of acetic acid and sodium acetate with a pH of 4.4, and stirred at 15° C. until the polyethylene glycol-polyglycerol-polyethylene glycol P123 was completely dissolved. Then, 6 grams of trimethylpentane were added into the above solution and stirred at 15° C. for 8 hours, and 2.13 grams of tetramethoxysilane were then added thereto. After stirring at 15° C. for 20 hours, the resultant solution was transferred into a polytetrafluoroethylene-lined reactor and allowed to crystallize at 60° C. for 24 hours, and a raw powder of an eggshell-like mesoporous material was then obtained through filtering, washing with deionized water, and drying. The raw powder of the eggshell-like mesoporous material was calcined in a muffle furnace at 550° C. for 24 hours to remove the template agent, to obtain a template agent-removed eggshell-like mesoporous material D5 with a particle size between 3 and 22 µm. Then, the template agent-removed eggshell-like mesoporous material D5 was thermally activated by calcining under nitrogen atmosphere at 400° C. for 10 h, to remove the hydroxyl groups and residual moisture from the eggshell-like mesoporous material D5, thereby obtaining a thermally activated eggshell-like mesoporous material. Under nitrogen atmosphere, the thermally activated mesoporous material was sampled and then measured on the MA-30 smart Karl Fischer moisture analyzer. It was found that the mesoporous material had a moisture content of 300 ppm (on mass basis). Furthermore, it was found through the ONH-3000 oxygen, nitrogen and hydrogen analyzer that the mesoporous material had an oxygen content of 280 ppm (on mass basis).

10 g of the above thermally activated eggshell-like mesoporous material D5 and 1 g of dichlorodimethylsilane were taken into a 100 mL ball mill jar, with the material of the ball mill jar being polytetrafluoroethylene, the material of the milling balls being agate, the diameters of the milling balls ranging from 3 to 15 mm, and the number of the milling balls being 30 (including large balls (having a diameter greater than 10 mm), medium balls (having a diameter between 6 and 10 mm), and small balls (having a diameter less than 6 mm) in a number ratio of roughly 1:2:3). The ball mill jar was closed, and ball milling was performed at a temperature inside the ball mill jar of 25° C. and a rotary speed of the ball mill jar of 400 r/min for 12 hours, to obtain milled eggshell-like mesoporous material carrier D5 (10 g).

(II) Preparation of Polyolefin Catalyst

A polyolefin catalyst Cat-D-5 was prepared by following the procedure as described in Example 1.

Comparative Example 6

(I) Carrier Preparation 4 g (0.0007 mol) of template agent P123 was added into a solution of 16.4 mL of 37 wt % hydrochloric acid in 128 mL of water, and stirred at 40° C. until the P123 was completely dissolved. Then, 8.86 g (0.042 mol) of ethyl orthosilicate was added to the above solution and stirred at 40° C. for 24 h, and the resultant solution was then transferred into a polytetrafluoroethylene-lined reactor and allowed to crystallize at 150° C. for 24 hours. A raw powder of a mesoporous material was then obtained through filtering, washing with deionized water 4 times, suction filtering, and drying. The raw powder of the mesoporous material was washed with ethanol under reflux conditions for 24 hours to remove the template agent, to obtain a mesoporous molecular sieve D6. Then, the template agent-removed product was thermally activated by calcining under nitrogen atmosphere at 400° C. for 10 h to remove the hydroxyl groups and residual moisture from the mesoporous material, thereby obtaining thermally activated mesoporous material D6. Under nitrogen atmosphere, the thermally activated mesoporous material was sampled and then measured on the MA-30 smart Karl Fischer moisture analyzer. It was found that the mesoporous material had a moisture content of 250 ppm (on mass basis). Furthermore, it was found through the ONH-3000 oxygen, nitrogen and hydrogen analyzer that the mesoporous material had an oxygen gas content of 390 ppm (on mass basis).

10 g of the above thermally activated mesoporous material D6 and 1 g of dichlorodimethylsilane were taken into a 100 mL ball mill jar, with the material of the ball mill jar being polytetrafluoroethylene, the material of the milling balls being agate, the diameters of the milling balls ranging from 3 to 15 mm, and the number of the milling balls being 30. The ball mill jar was closed, and ball milling was performed at a temperature inside the ball mill jar of 25° C. and a rotary speed of the ball mill jar of 400 r/min for 12 hours, to obtain mesoporous material carrier D6 having an average particle size of 1 µm to 10 µm (10 g).

Figure 3:
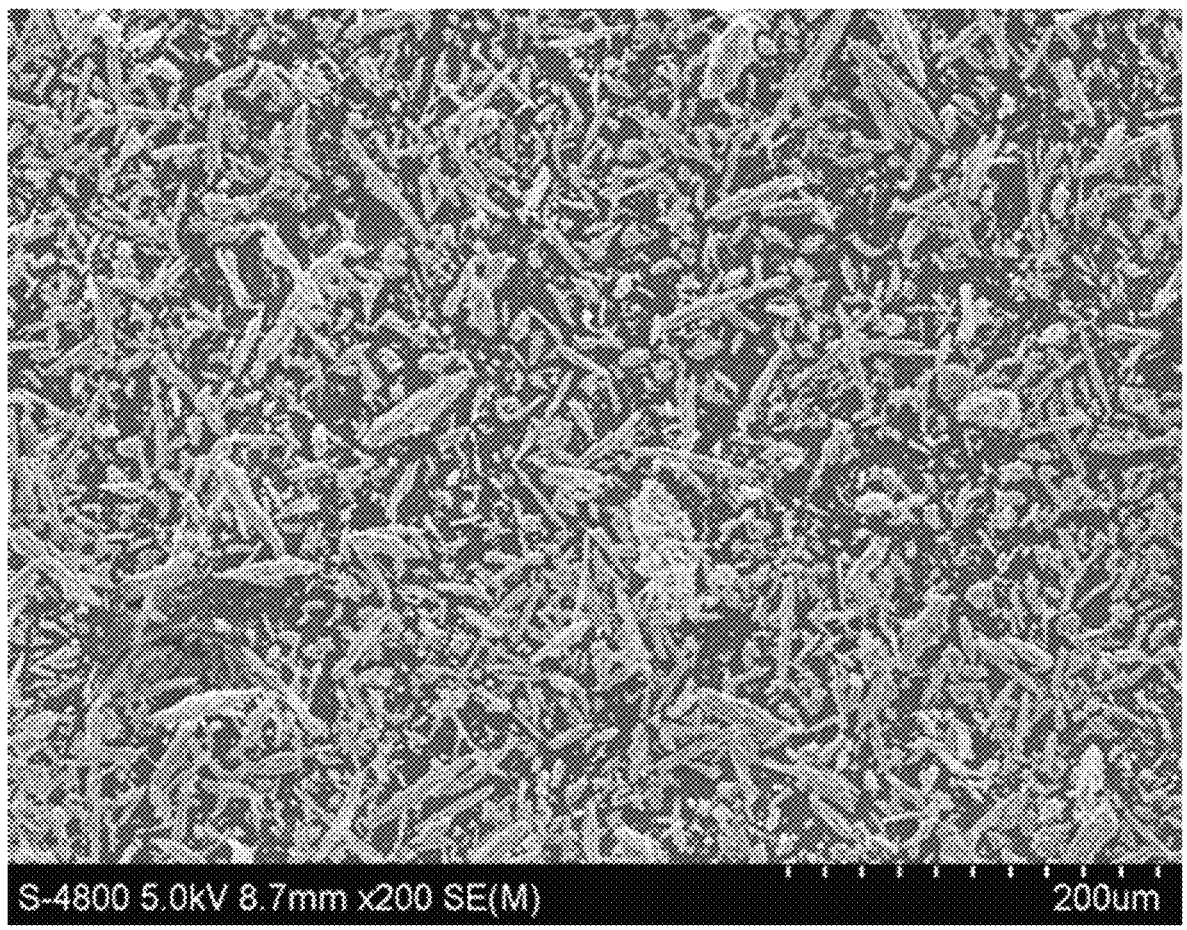
FIG. 3 is a scanning electron microscope (SEM) image of the mesoporous material provided by Comparative Example 6.

FIG. 3 is a scanning electron microscope image of the mesoporous material D6 prepared in Comparative Example 6. It can be seen from the SEM image that the mesoporous material is of rod shape.

Figure 4:
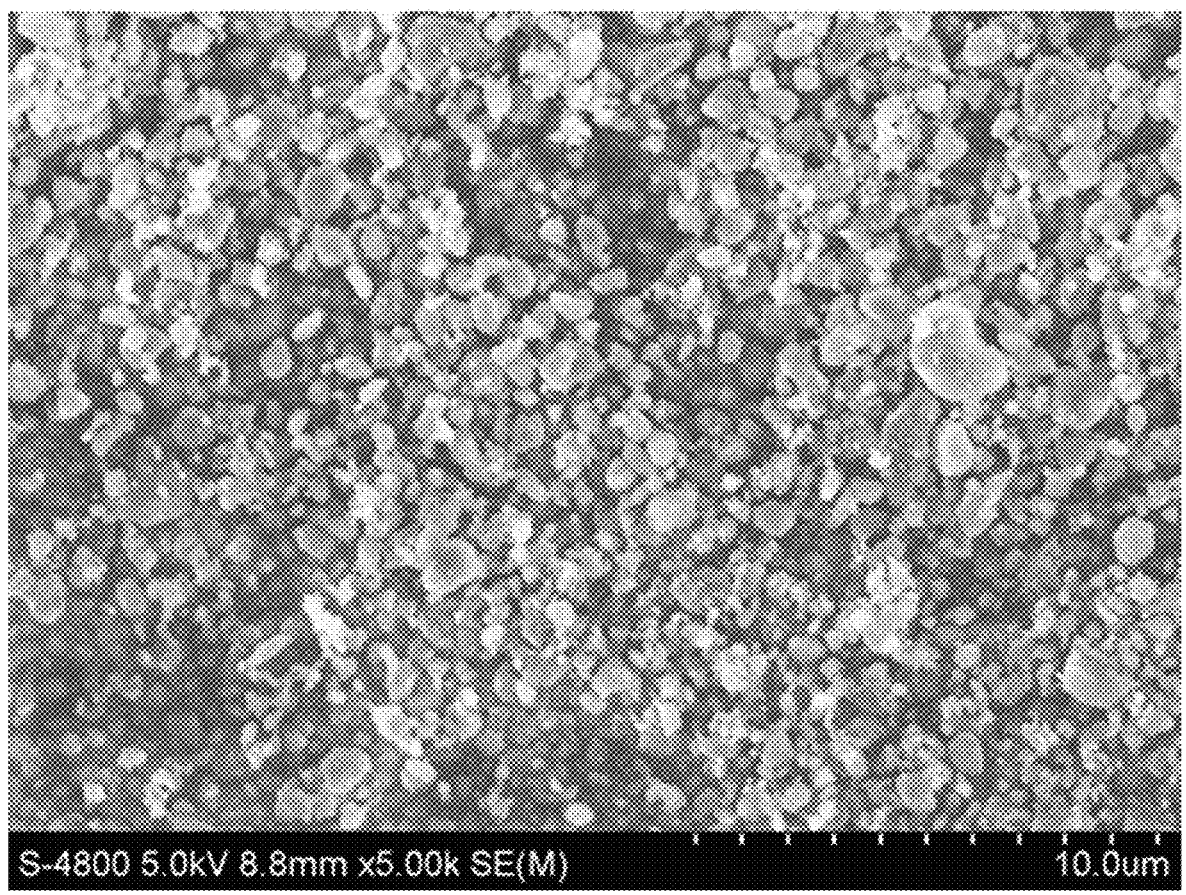
FIG. 4 and FIG. 5 are SEM images of the mesoporous material provided by Comparative Example 6 in different field of view after ball milling.
Figure 5:
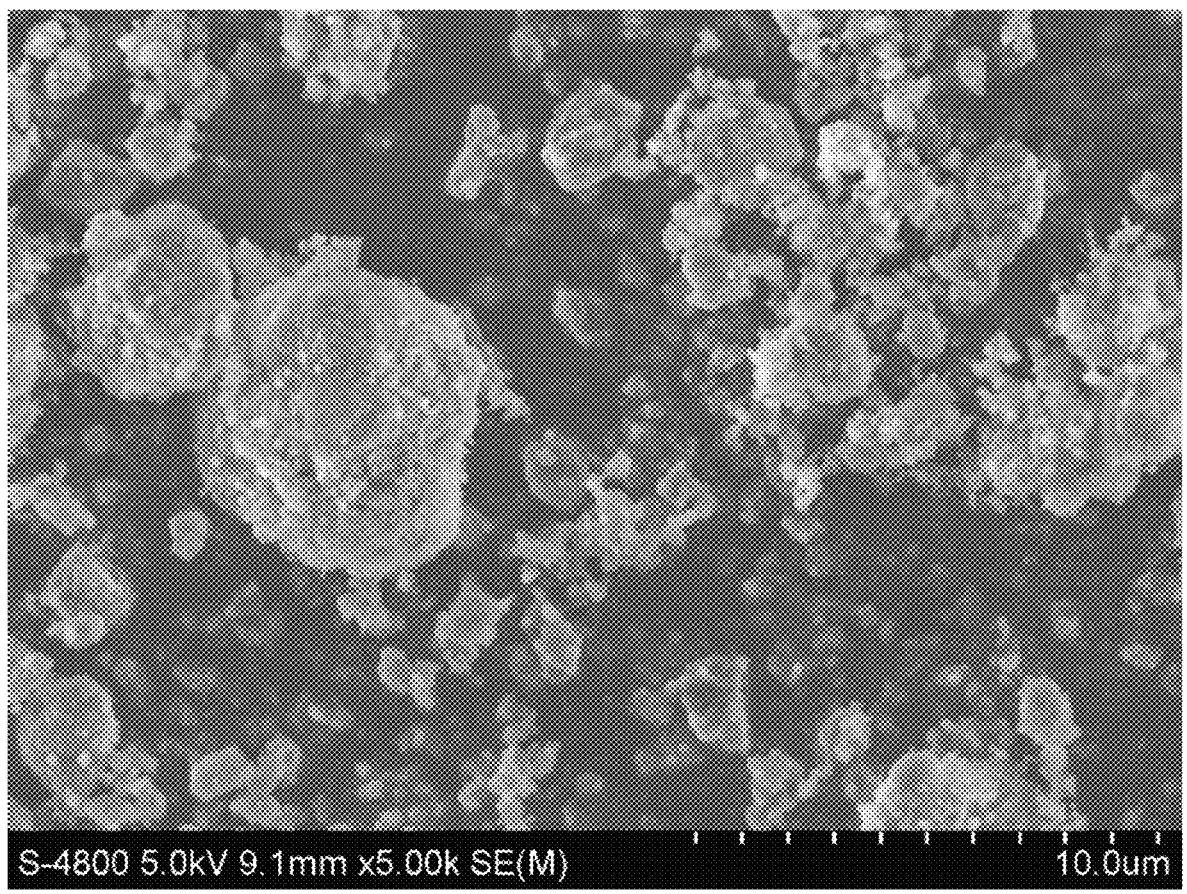

FIGS. 4 to 5 are scanning electron microscope (SEM) images of the mesoporous material D6 prepared in Comparative Example 6, which has subjected to ball milling, in different field of view. It can be seen from the SEM images that the mesoporous material D6 is completely broken after ball milling.

(II) Preparation of Polyolefin Catalyst

A polyolefin catalyst Cat-D-6 was prepared by following the procedure as described in Example 1.

Comparative Example 7

A polyolefin catalyst component was prepared by following the procedure as described in Example 1, except that in (I) carrier preparation, the same weight of cyclohexane was used instead of heptane, thereby obtaining mesoporous material D7.

Under nitrogen atmosphere, the thermally activated mesoporous material was sampled and then measured on the MA-30 smart Karl Fischer moisture analyzer. It was found that the mesoporous material had a moisture content of 100 ppm (on mass basis). Furthermore, it was found through the ONH-3000 oxygen, nitrogen and hydrogen analyzer that the mesoporous material had an oxygen gas content of 130 ppm (on mass basis).

A polyolefin catalyst Cat-D-7 was prepared by following the procedure as described in Example 1.

Comparative Example 8

A polyolefin catalyst component was prepared by following the procedure as described in Example 1, except that in (I) carrier preparation, no ammonium fluoride was used, thereby obtaining mesoporous material D8. Under nitrogen atmosphere, the thermally activated mesoporous material was sampled and then measured on the MA-30 smart Karl Fischer moisture analyzer. It was found that the mesoporous material had a moisture content of 112 ppm (on mass basis). Furthermore, it was found through the ONH-3000 oxygen, nitrogen and hydrogen analyzer that the mesoporous material had an oxygen content of 109 ppm (on mass basis). A polyolefin catalyst Cat-D-8 was prepared by following the procedure as described in Example 1.

Comparative Example 9

A polyolefin catalyst component was prepared by following the procedure as described in Example 1, except that in (I) carrier preparation, only the primary thermal activation treatment was used, thereby obtaining sphere-like super-macroporous mesoporous material carrier D9. Under nitrogen atmosphere, the thermally activated mesoporous material was sampled and then measured on the MA-30 smart Karl Fischer moisture analyzer. It was found that the mesoporous material had a moisture content of 60 ppm (on mass basis). Furthermore, it was found through the ONH-3000 oxygen, nitrogen and hydrogen analyzer that the mesoporous material had an oxygen content of 50 ppm (on mass basis). A polyolefin catalyst Cat-D-9 was prepared by following the procedure as described in Example 1.

TABLE 2

Structural parameters of catalysts

| Sample | Specific surface area ($m^2/g$) | Pore volume (mL/g) | Most probable pore diameter (nm) | Particle size (μm) | SPAN |
|---|---|---|---|---|---|
| Catalyst Cat-1 | 220 | 0.8 | 10 | 5-15 | 0.9 |
| Catalyst Cat-D-1 | 200 | 0.7 | 9 | 5-15 | 0.9 |
| Catalyst Cat-D-2 | 190 | 0.8 | 9 | 5-15 | 0.9 |
| Catalyst Cat-D-3 | 184 | 0.9 | 9 | 5-15 | 0.9 |
| Catalyst Cat-2 | 300 | 1 | 12 | 3-25 | 0.95 |
| Catalyst Cat-3 | 120 | 0.5 | 7.1 | 3-25 | 0.86 |
| Catalyst Cat-4 | 300 | 1 | 6.5 | 5-15 | 1.1 |
| Catalyst Cat-5 | 270 | 0.7 | 11 | 3-25 | 0.92 |
| Catalyst Cat-6 | 180 | 0.9 | 8.4 | 3-25 | 0.87 |
| Catalyst Cat-D-4 | 749 | 0.5 | 2.4 | 4-15 | 0.92 |
| Catalyst Cat-D-5 | 246 | 0.65 | 7.6 | 3-25 | 0.95 |
| Catalyst Cat-D-6 | 567 | 0.6 | 4.4 | 1-15 | 1.73 |
| Catalyst Cat-D-7 | 430 | 0.4 | 5.8 | 4-30 | 1.9 |
| Catalyst Cat-D-8 | 109 | 1.3 | 5.4 | 5-31 | 2.1 |
| Catalyst Cat-D-9 | 220 | 0.7 | 9 | 3-25 | 0.9 |

Working Example 1

This example is used to illustrate the method for preparing polyethylene by polymerizing ethylene with the polyolefin catalyst Cat-1 of the present disclosure.

The atmosphere in a 2 L stainless steel polymerization autoclave was replaced with nitrogen three times and then with ethylene three times. 1 L of hexane, 1 mmol of triethylaluminum and 20 to 50 mg of the catalyst Cat-1 were added into the stirred 2 L stainless steel polymerization autoclave, then the temperature was raised to 85° C., hydrogen was added to 0.28 MPa, and then the total pressure of the system was maintained at 1 MPa with ethylene for polymerization. After the reaction had been carried out for 2 hours, the addition of ethylene was stopped, the temperature was lowered, and the pressure was released. A polyethylene powder was taken out for weighing, and the catalyst

TABLE 1

Structural parameters of mesoporous materials

| Sample | Specific surface area ($m^2/g$) | Pore volume (mL/g) | Pore diameter (nm) | Average particle size (μm) | SPAN | Contact angle (°) | Wear resistance (N/cm) | Moisture content (ppm) | Oxygen content (ppm) |
|---|---|---|---|---|---|---|---|---|---|
| C1 | 350 | 1.5 | 12 | 1.1-2.9 | 1.4 | 120 | 0.3 | <0.1 | <0.1 |
| D1 | 300 | 0 | 0 | 0.02-0.1 | 1.3 | 100 | 0.3 | <0.1 | <0.1 |
| C2 | 400 | 2 | 10 | 1-3 | 2.8 | 130 | 0.5 | <0.1 | <0.1 |
| C3 | 300 | 1 | 15 | 1-3 | 3 | 125 | 0.45 | <0.1 | <0.1 |
| C4 | 250 | 1 | 9 | 1-3 | 0.2 | 115 | 0.03 | <0.1 | <0.1 |
| C5 | 300 | 1.9 | 13 | 1-3 | 2.6 | 115 | 0.45 | <0.1 | <0.1 |
| C6 | 400 | 1 | 11 | 1-3 | 3 | 101 | 0.01 | <0.1 | <0.1 |
| D4 | 800 | 0.6 | 3 | 3-9 | 5.1 | 102 | 0.001 | 500 | 300 |
| D5 | 261 | 0.8 | 9.8 | 3-22 | 10 | 100 | 0.0005 | 300 | 280 |
| D6 | 598 | 0.7 | 4.8 | 1-10 | 6.9 | 100 | 0.0005 | 250 | 390 |
| D7 | 500 | 0.5 | 8 | 4-10 | 5.1 | 95 | 0.001 | 100 | 130 |
| D8 | 250 | 3.5 | 7.2 | 5-15 | 6.3 | 86 | 0.001 | 112 | 109 |
| D9 | 360 | 2.5 | 11 | 1-3 | 1.9 | 118 | 0.3 | 60 | 50 | activity was calculated. The molecular weight distribution and melt index $MI_{2.16}$ of the polyethylene powder as well as the productivity of the catalyst are listed in Table 3.

Working Comparative Examples 1-9 and Working Examples 2-6 were carried out in the same manner as Working Example 1.

TABLE 3

| Example No. | Molecular weight distribution of polymer powder (Mw/Mn) | Melt index MI2.16 (g/10 min) | Catalyst productivity (gPE/ gcat · h) |
|---|---|---|---|
| Working Example 1 | 2.9 | 2.5 | 28000 |
| Working Comparative Example 1 | 6.3 | 1.05 | 6100 |
| Working Comparative Example 2 | 7.2 | 0.06 | 6300 |
| Working Comparative Example 3 | 5.64 | 0.11 | 1235 |
| Working Example 2 | 3.2 | 1.7 | 27000 |
| Working Example 3 | 2.7 | 1.82 | 27160 |
| Working Example 4 | 3.2 | 1.6 | 25000 |
| Working Example 5 | 3.1 | 1.66 | 25800 |
| Working Example 6 | 3.16 | 1.63 | 26100 |
| Working Comparative Example 4 | 3.95 | 1.4 | 19500 |
| Working Comparative Example 5 | 4 | 1.5 | 19000 |
| Working Comparative Example 6 | 4.01 | 1.6 | 17000 |
| Working Comparative Example 7 | 5.3 | 0.79 | 10500 |
| Working Comparative Example 8 | 4.93 | 1.32 | 7639 |
| Working Comparative Example 9 | 3.2 | 1.52 | 20000 |

It can be seen from Tables 1 to 3 that the sphere-like super-macroporous mesoporous material $C_1$ provided by the present disclosure as a carrier has the most moderate average particle size distribution (1 μm to 3 μm) and specific surface area (350 m²/g), and can be directly used as a catalyst carrier without ball milling. The catalyst prepared from the sphere-like super-macroporous mesoporous material $C_1$ has a high catalytic activity. Specifically, the catalyst prepared from the sphere-like super-macroporous mesoporous material carrier $C_1$ has the highest catalyst efficiency of 28,000 gPE/gcat·h in the ethylene polymerization process.

In contrast, the comparative D4 has an average particle size distribution of 3 to 9 μm and a specific surface area of 800 m²/g; D5 has an average particle size of 3 to 22 μm and a specific surface area of 261 m²/g; D6 has an average particle size of 1 to 10 μm and a specific surface area of 598 m²/g. The mesoporous materials D4-D5 have a wide particle size distribution so that these three materials can be used as polyolefin catalyst carrier only after having been subjected to grinding. However, the ball milling will directly damage or even block the pores of the mesoporous material carrier (FIG. 3, FIG. 4, and FIG. 5), resulting in a decrease in catalyst activity. The catalyst made from the mesoporous material D4 exhibits a catalyst efficiency in the ethylene polymerization process of 19,500 gPE/gcat·h; the catalyst made from the mesoporous material D5 exhibits a catalyst efficiency in the ethylene polymerization process of 19,000 gPE/gcat·h; and the catalyst made from the mesoporous material D6 exhibits a catalyst efficiency in the ethylene polymerization process of 17,000 gPE/gcat·h.

Thus, it can be seen that if the specific surface is too large (>500 m²/g) or too small (<280 m²/g), it is not conducive to the synthesis of a polyethylene catalyst with high catalytic activity. This is because when the specific surface area is too large (>500 m²/g), the loading amount will be too large during the catalyst synthesis so that an explosive polymerization tends to occur in the ethylene polymerization, directly leading to the reduction of catalytic activity. On the other hand, if the specific surface area is too small (<280 m²/g), the loading amount will be small during the catalyst synthesis so that the catalyst performance will be insufficient during the ethylene polymerization, directly leading to the reduction of catalytic activity.

This results in that these three materials can be used as polyolefin catalyst carrier only after having been subjected to ball milling. However, the ball milling will directly damage the pores of the mesoporous material carrier or result in the block of the pores of the mesoporous material carrier, leading to the decrease of the catalyst activity.

It can also be seen from Tables 1 to 3 that the sphere-like super-macroporous mesoporous material $C_1$ provided by the present disclosure has an average pore diameter of 12 nm. Such an average pore diameter of material is the most moderate, the material can be used directly as a catalyst carrier, and the highest catalyst efficiency of 28,000 gPEgcat·h is obtained. The comparative D4 has an average pore diameter of 3 nm, and the corresponding catalyst efficiency is 19,500 gPEgcat·h; the comparative D5 has an average pore diameter of 9.8 nm, and the corresponding catalyst efficiency is 19,000 gPE/gcat·h; the comparative D6 has an average pore diameter of 4.8 nm, and the corresponding catalyst efficiency is 17,000 gPE/gcat·h. The catalyst efficiencies for all of the three comparative examples are less than the catalyst efficiency for the sphere-like carrier. It can be therefore seen that an average pore diameter less than 10 nm is not conducive to the synthesis of polyethylene catalysts with high catalytic activity. The reason is, if the average pore diameter is less than 10 nm, then the macromolecular catalyst is not easy to enter the pores during the catalyst synthesis so that the catalytic efficiency will be insufficient during the ethylene polymerization, directly leading to the reduction of catalytic activity. Therefore, the average pore diameter of the sphere-like mesoporous material $C_1$, which is 12 nm, is the most moderate. This directly leads to the highest catalytic activity of 28,000 gPE/gcat·h in the ethylene polymerization process.

It can also be seen from the results in Table 3 that the polyolefin catalyst component prepared by supporting the titanium component and the magnesium component on the sphere-like super-macroporous mesoporous material carrier prepared by the method of the present disclosure has a high catalytic activity, polymer particles obtained by using said polyolefin catalyst component to catalyze ethylene polymerization have good morphology and excellent flowability, the melt index of the polymer powder is relatively large, and the molecular weight distribution of the polymer powder is narrow. These characteristics bring convenience to the storage, transportation, post-handling and application of the obtained polyolefin catalyst. In addition, when using the method of the present disclosure to prepare a supported catalyst, sphere-like polyolefin catalysts can be directly obtained in one step through the spray drying method, and the operation is simple and convenient.

The preferred embodiments of the present disclosure have been described in detail above, but the present disclosure is not limited thereto. A variety of simple modifications can be made to the technical solutions of the present disclosure within the scope of the technical concept of the present disclosure, including the combinations of various technical features in any other suitable manner.

These simple modifications and combinations should also be regarded as the disclosures of the present invention, and all of them belong to the protection scope of the present invention.

We claim:

1. A mesoporous silica material, which comprises a two-dimensional hexagonal ordered channel structure, wherein the mesoporous silica material has an average pore diameter of from 10 nm to 15 nm, a specific surface area of from 300 m$^2$/g to 400 m$^2$/g, and an average particle size of from 1 μm to 3 μm; the mass content of water in the mesoporous silica material is less than 1 ppm, and a mass content of oxygen gas in the mesoporous silica material is less than 1 ppm, based on the total mass of the mesoporous silica material.

2. The mesoporous silica material as claimed in claim 1, having at least one of the following features:
   the mesoporous silica material has a water contact angle of 101° to 130°;
   the mesoporous silica material has a crushing strength of 0.001 N/cm to 0.6 N/cm;
   the mesoporous silica material has a pore volume of 1 mL/g to 2 mL/g,
   the mesoporous silica material has a particle size distribution of 0.01 to 3.

3. The mesoporous silica material as claimed in claim 1, wherein the mesoporous silica material is obtained by treatment with a chlorine-containing silane.

4. The mesoporous silica material as claimed in claim 3, wherein the chlorine-containing silane is at least one selected from the group consisting of dichlorodimethoxysilane, monochlorotrimethoxysilane, dichlorodiethoxysilane, and monochlorotriethoxysilane.

5. The mesoporous silica material as claimed in claim 1, wherein the mesoporous silica material has an average pore diameter of from 11 nm to 13 nm, a specific surface area of from 310 m$^2$/g to 380 m$^2$/g, and an average particle size of from 1.1 μm to 2.9 μm.

6. A method for preparing a mesoporous silica material, comprising:
   (1) mixing and contacting a silicon source, an acid agent, ammonium fluoride and heptane in the presence of a template agent and water, and subjecting the mixture resulting from the mixing and contacting in sequence to crystallization, filtering and drying, to obtain a raw powder of the mesoporous silica material; and
   (2) subjecting the raw powder of the mesoporous silica material in sequence to a template agent-removing treatment, a primary thermal activation treatment and a secondary thermal activation treatment, to obtain the mesoporous silica material.

7. The method as claimed in claim 6, having at least one of the following features:
   in step (2), conditions for the primary thermal activation treatment include: in an inert atmosphere, a treatment temperature of from 250° C. to 900° C., and a treatment time of from 1 to 48 hours;
   in step (2), conditions for the secondary thermal activation treatment include: in an inert atmosphere, a treatment temperature of from 250° C. to 900° C., and a treatment time of from 1 to 48 hours; and
   in step (2), the conditions for the primary thermal activation treatment are the same as conditions for the secondary thermal activation treatment.

8. The method as claimed in claim 7, wherein in step (2), the conditions for the primary thermal activation treatment include: in an inert atmosphere, a treatment temperature of from 250° C. to 700° C., and a treatment time of from 4 to 48 hours; and/or in step (2), the conditions for the secondary thermal activation treatment include: in an inert atmosphere, a treatment temperature of 250° C. to 700° C., and a treatment time of from 4 to 48 hours.

9. The method as claimed in claim 6, having at least one of the following features:
   in step (1), the mixing and contacting are carried out as follows: the silicon source, the acid agent, the ammonium fluoride and the heptane are stirred in the presence of the template agent and water at a temperature of 25° C. to 60° C. for a period of time of 4 minutes or more, and then the resulting mixture is left stand still for 1 hour or more;
   in step (1), the acid agent is at least one of hydrochloric acid, sulfuric acid, nitric acid and hydrobromic acid;
   in step (1), the silicon source is at least one of ethyl orthosilicate, methyl orthosilicate, propyl orthosilicate, sodium orthosilicate and silica sol;
   a molar ratio of the template agent to the silicon source to the acid agent to the ammonium fluoride to the heptane is 1:2 to 500:100 to 2000:0.7 to 200:20 to 1650;
   the template agent is a triblock copolymer of polyoxyethylene-polyoxypropylene-polyoxyethylene ($EO_2PO_{70}EO_{20}$);
   the conditions for the crystallization include a crystallization temperature of 90° C. to 180° C. and a crystallization time of 10 h to 40 h; and
   in step (2), the template agent-removing treatment includes washing the raw powder of the mesoporous silica material with an alcohol at 90 to 120° C. for 10 to 40 hours.

10. The method as claimed in claim 6, wherein the method further comprises, step b) mixing a thermally activated mesoporous silica material from step b) with a chlorine-containing silane.

11. The method as claimed in claim 10, wherein the chlorine-containing silane is at least one selected from the group consisting of dichlorodimethoxysilane, monochlorotrimethoxysilane, dichlorodiethoxysilane, and monochlorotriethoxysilane.

12. The method as claimed in claim 6, wherein the method does not comprise a grinding step after the thermal activation treatment.

13. The mesoporous silica material as claimed in claim 1, wherein the mass content of water in the mesoporous silica material is less than 0.5 ppm, and the mass content of oxygen gas in the mesoporous silica material is less than 0.5 ppm, based on the total mass of the mesoporous silica material.

14. A polyolefin catalyst comprising a magnesium component and a titanium component and an optional supported on a carrier, wherein the carrier comprises the mesoporous silica material as claimed in claim 1.

15. The polyolefin catalyst as claimed in claim 14, having at least one of the following features:
   the content of the carrier is from 20 wt. % to 90 wt. %, based on the total weight of the polyolefin catalyst;
   the content of the magnesium component in terms of magnesium element is from 1 wt. % to 50 wt. %, based on the total weight of the polyolefin catalyst;
   the content of the titanium component in terms of titanium element is from 1 wt. % to 50 wt. %, based on the total weight of the polyolefin catalyst;
   the polyolefin catalyst has a pore volume of from 0.5 mL/g to 1 mL/g;
   the polyolefin catalyst has a specific surface area of from 120 m$^2$/g to 300 m$^2$/g;
   the polyolefin catalyst has a most probable pore diameter of from 7 nm to 12 nm;
   the polyolefin catalyst has an average particle size of from 3 μm to 25 μm; and the polyolefin catalyst has a particle size distribution value of from 0.85 to 0.95.

16. The polyolefin catalyst as claimed in claim 15, having at least one of the following features:
the content of the carrier is from 30 wt. % to 70 wt. %, based on the total weight of the polyolefin catalyst;
the content of the magnesium component in terms of magnesium element is from 1 wt. % to 30 wt. %, based on the total weight of the polyolefin catalyst; and
the content of the titanium component in terms of titanium element is from 1 wt. % to 30 wt. %, based on the total weight of the polyolefin catalyst.

17. A method for preparing the polyolefin catalyst as claimed in claim 14, comprising:
(i) under an inert atmosphere, (ia) conducting impregnation treatment of the mesoporous silica material with a solution containing a magnesium component and then with a solution containing a titanium component, (ib) conducting impregnation treatment of the mesoporous silica material with a solution containing a titanium component and then with a solution containing a magnesium component, or (ic) conducting co-impregnation treatment of the mesoporous silica material with a solution containing both a titanium component and a magnesium component, to obtain a slurry; and
(ii) spray drying the slurry from step (i) to obtain the polyolefin catalyst,
wherein the mesoporous silica material comprises a two-dimensional hexagonal ordered channel structure, and wherein the mesoporous silica material has an average pore diameter of from 10 nm to 15 nm, a specific surface area of from 300 $m^2/g$ to 400 $m^2/g$, and an average particle size of from 1 μm to 3 μm; the mass content of water in the mesoporous silica material is less than 1 ppm, and the mass content of oxygen gas in the mesoporous silica material is less than 1 ppm, based on the total mass of the mesoporous silica material.

18. An olefin polymerization method, comprising: a) polymerizing olefin monomer(s) under polymerization conditions in the presence of the polyolefin catalyst of claim 14 and a cocatalyst of alkyl aluminum to provide a polyolefin; and b) recovering the polyolefin.

* * * * *